United States Patent
Shpantzer et al.

(10) Patent No.: US 7,391,969 B2
(45) Date of Patent: *Jun. 24, 2008

(54) METHOD AND APPARATUS FOR PULSE GENERATION AND ADAPTIVE PULSE GENERATION FOR OPTICAL COMMUNICATIONS

(75) Inventors: Isaac Shpantzer, Bethesda, MD (US); Israel Smilanski, Rockville, MD (US); Jacob B. Khurgin, Baltimore, MD (US); Vladimir Grigoryan, Elkridge, MD (US); Pak Shing Cho, Gaithersburg, MD (US); Nadejda Reingand, Baltimore, MD (US); Guy Levy-Yurista, Tel Aviv (IL); Guoliang Li, North Potomac, MD (US)

(73) Assignee: CeLight, Inc., Silver Spring, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/616,417

(22) Filed: Dec. 27, 2006

(65) Prior Publication Data
US 2007/0140705 A1    Jun. 21, 2007

Related U.S. Application Data

(63) Continuation of application No. 10/215,036, filed on Aug. 9, 2002, now Pat. No. 7,266,307, which is a continuation-in-part of application No. 10/173,579, filed on Jun. 18, 2002.

(51) Int. Cl.
*H04B 10/08* (2006.01)
(52) U.S. Cl. .......................................... 398/25; 398/28
(58) Field of Classification Search ................... 398/25, 398/28
See application file for complete search history.

(56) References Cited

U.S. PATENT DOCUMENTS

| | | | | |
|---|---|---|---|---|
| 5,850,305 | A * | 12/1998 | Pidgeon | ...................... 398/193 |
| 6,735,395 | B1* | 5/2004 | Bai | ............... 398/95 |
| 2002/0149824 | A1* | 10/2002 | Beaulieu et al. | ............ 359/158 |

* cited by examiner

*Primary Examiner*—Dalzid Singh
(74) *Attorney, Agent, or Firm*—Nadejda Reingand

(57) ABSTRACT

One embodiment of the invention relates to producing optical pulses for use on a transmission link. A light source is configured to produce an optical signal. A pulse generator is coupled to the light source. The pulse generator is configured to receive, for a first channel, the optical signal and a clock signal. The pulse generator is also configured to modify the optical signal based on the clock signal to produce an optical pulse having a predetermined pulse shape. The clock signal is associated with the predetermined pulse shape. The predetermined pulse shape being based on a transmission characteristic of the transmission link.

28 Claims, 22 Drawing Sheets

METHOD AND APPARATUS FOR PULSE GENERATION AND ADAPTIVE PULSE GENERATION FOR OPTICAL COMMUNICATIONS

CROSS-REFERENCE TO RELATED APPLICATIONS

This application is a continuation of U.S. patent application Ser. No. 10/215,036 filed Aug. 9, 2002 now U.S. Pat. No. 7,266,307. This application claims priority to U.S. patent application Ser. No. 10/084,057, entitled "Method and System for mitigating nonlinear transmission impairments in fiber-optic communications systems," filed on Feb. 28, 2002, which claims priority to No. 60/352,991, entitled "Optical communication system and method," filed on Feb. 1, 2002; both the entirety of which are incorporated herein by reference. This application is also continuation-in-part of the patent application Ser. No. 10/173,579 "Light source for generating output signal having evenly spaced apart frequencies," filed on Jun. 18, 2002, the entirety of which is incorporated herein by reference.

BACKGROUND

The invention relates generally to optical communications such as a system and method for optical communications with data rates of at least 10 Gbit/s.

Many of optical communication systems with data rates of at least 10 Gbit/s are based on a return-to-zero (RZ) format for data transmission. Such known optical communication systems typically relate to generating an optimal pulse shape or to evaluating the pulse shape once generated.

For example, adaptive pulse shaping in free space and in the 850 nm spectral range had been disclosed in D. Yelin et al., "Adaptive femtosecond pulse compression," Opt. Letters, 1997, v. 22, #23, pp. 1793-1795. The input pulse arrives from a comb generator (in this case, a mode-locked laser), and is spatially separated into its spectral component by a grating. A lens maps each wavelength group onto a separate pixel of a computer-controlled phase modulator. A second lens and grating recombine the components back together to form a controlled output pulse. A doubler crystal samples the output pulse. This crystal produces pulses that are higher the shorter the pulse is. By using an appropriate algorithm, a computer can adapt the phases of the different spectral components of the input pulses so that for each type of input pulse, the shortest pulse possible should be produced by the device. The shortest pulse is considered as the most optimal for the communication system.

An alternative but analogous method was disclosed in K. Kitayama et al. "Optical pulse train synthesis of arbitrary waveform using weight/phase-programmable 32-tapped delay line waveguide filter," Proceedings of OFC-2001, paper WY3-1. Similar to the Yelin system, the pulse source in Kitayama is a comb generator, but the pulse shaping is done through a parallel series of delay lines and attenuators.

These known devices, however, suffer several shortcomings. For example, these known devices are quite complex from the technical point of view. In addition, because these known devices typically relate to generating an optimal pulse shape or to evaluating the pulse shape once generated, such devices are bulky, expensive and not appropriate for use in commercial systems.

Moreover, in real optical communication system, either terrestrial or undersea, the fiber conditions and multiple component operations change in time. Therefore, the optimal pulse shape is different for the every particular time interval. The best performance of the pulse generator or pulse shaper should include a closed loop to correct adaptively the changing conditions. An adaptive approach for the pulse shaping in fiber communication has been developed by a number of research groups (see, for example, F. G. Omenetto, M. D. Moores, B. P. Luce, D. H. Reitze and A. J. Taylor "Femtosecond pulse delivery through single-mode optical fiber with adaptive pulse shaping," Proceedings CLEO'2001, pp. 234-235). Indeed, such an approach can provide a mechanism to overcome multiple limitations associated with nonlinear effects and provides an opportunity to synthesize pulses that are self-correcting for higher order nonlinear effects when being launched in the fiber.

As discussed below, in the present invention, a device is described that can be implemented in real RZ communication systems and can provide a number of advantages from the point of view of chromatic dispersion reduction and nonlinear effects mitigation. This results in an improvement of the communication link figure of merit: cost/(capacity*distance). The described device provides new technical solutions in the pulse formation and in the pulse shape evaluation together with adaptive shaping in time.

SUMMARY OF THE INVENTION

One embodiment of the invention relates to producing optical pulses for use on a transmission link. A light source is configured to produce an optical signal. A pulse generator is coupled to the light source. The pulse generator is configured to receive, for a first channel, the optical signal and a clock signal. The pulse generator is also configured to modify the optical signal based on the signal to produce an optical pulse having a predetermined pulse shape. The signal is associated with the predetermined pulse shape. The predetermined pulse shape being based on a transmission characteristic of the transmission link.

Another embodiment of the invention relates to the generation of pulses having a pre-determined shape using amplitude or phase modulation by generating at least two signals at strong side harmonic frequencies and combining them to create the pulse.

Another embodiment of the invention relates to the method and device for generating pulses having a pre-determined shape and pre-chirp using a combination of amplitude or phase modulators and a slow phase shifter. The slow phase shifter produces a chirp by introducing a relative phase shift between the carrier and the side harmonics.

Another embodiment of the invention relates to the method and device for generating pulses having a pre-determined pulse shape based on comb-generator that produces light with a set of frequencies evenly spaced apart.

Another embodiment of the invention relates to measuring an optical pulse shape after being transmitted on a communication link. A photodiode is configured to receive an optical pulse having a first spectral component, a second spectral component and a third spectral component. The second spectral component and the third spectral component are based on a clock frequency. The photodiode is configured to send a first signal having an amplitude and a spectral component with the clock frequency. A filter is coupled to the photodiode. The filter has a spectral response associated with the clock frequency. A detector is coupled to the filter. The detector is configured to send an error signal based on the amplitude of the first signal.

Another embodiment relating to measuring an optical pulse shape includes a dispersion device and a balanced detector. The dispersion device is configured to receive a first portion of an optical signal on a first optical path and a second portion of the optical signal on a second optical path. The dispersion device is further configured to introduce a first dispersion into the first portion of the optical signal and a second dispersion into the second optical signal. The first dispersion has its own amplitude and sign. The second dispersion has its own amplitude and sign. The amplitude of the first dispersion is substantially equal to the amplitude of the second dispersion. The sign of the first dispersion is opposite of the sign of the second dispersion. The balanced detector coupled to the dispersion device.

Another embodiment relating to measuring an optical pulse shape is a method based on autocorrelation. The device includes, for example, an optical hybrid, delay line and balanced detectors. In this embodiment, as described below, the width of the incoming optical pulse is measured not in one short measurement but through a series of measurements over multiple pulses.

Another embodiment of the invention relates to adaptive pulse shaping. An optical signal received from a transmission link is measured. The optical signal includes a set of optical pulses having an estimated pulse width. A first dispersion is introduced into a first portion of an optical signal on a first optical path. A second dispersion is introduced into a second portion of the optical signal on a second path. The first dispersion has its own amplitude and sign. The second dispersion has its own amplitude and sign. The amplitude of the first dispersion is substantially equal to the amplitude of the second dispersion. The sign of the first dispersion is opposite of the sign of the second dispersion. The first portion of the optical signal is detected after the introducing of the first dispersion, and the second portion of the optical signal is detected after the introducing of the second dispersion to produce a balanced-detected signal.

Another embodiment of the invention relates to the software dithering method for adaptive pulse shaping.

DETAILED DESCRIPTION

Figure 1:
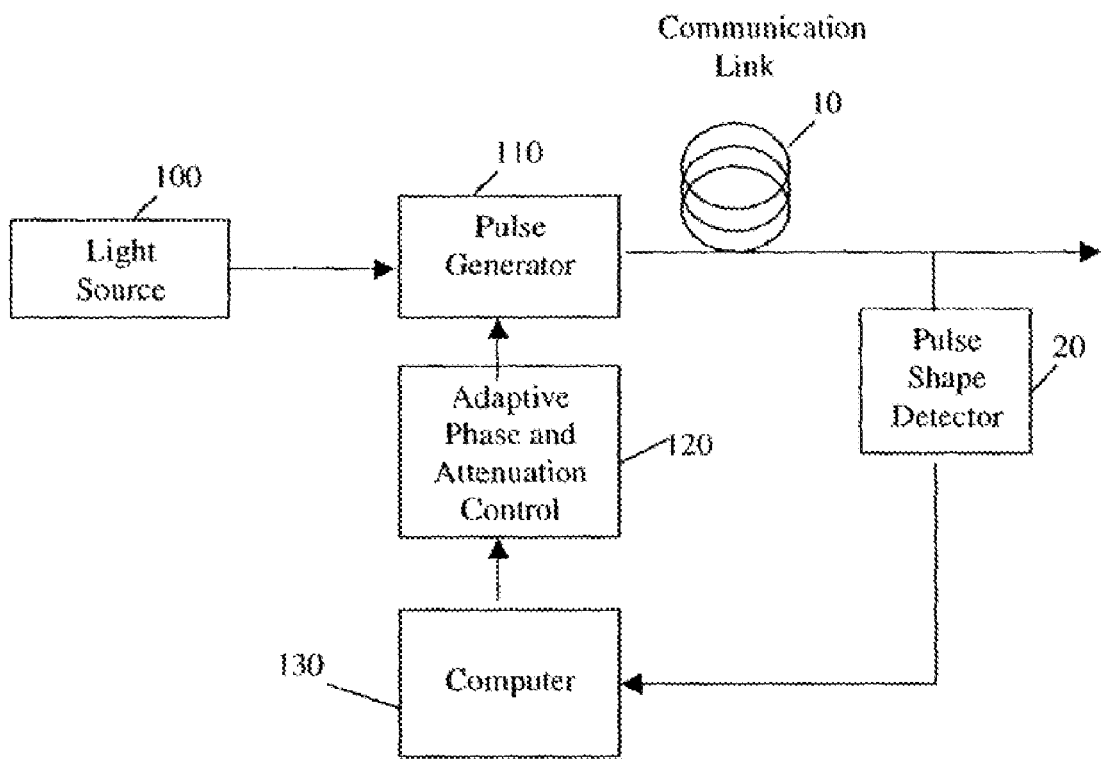
FIG. 1 shows a system block diagram of a communication system, according to an embodiment of the invention.

FIG. 1 shows a system block diagram of a communication system, according to an embodiment of the invention. As shown in FIG. 1, the communication system includes a light source 100, pulse generator 110, communication link 10, pulse shape detector 20, computer 130, and adaptive phase and attenuation control 120. The light source 100, pulse generator 110, adaptive phase and attention control 120 and computer 130 are typically located within a transmitter system. The pulse shape detector 20 is typically located within a receiver system. The communication link 10 connects the transmitter system and the receiver system.

Figure 2:
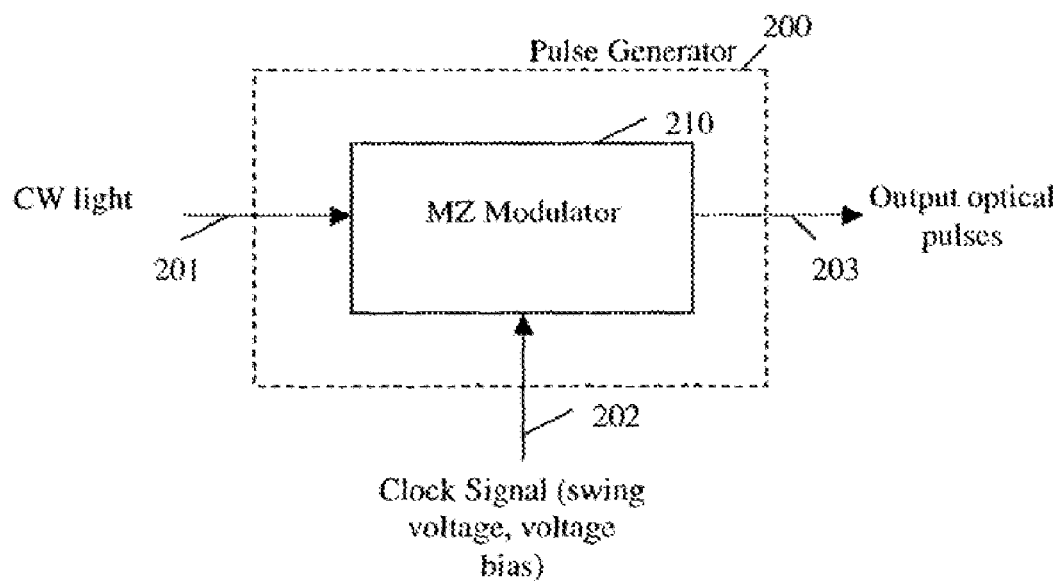
FIG. 2 shows a system block diagram of a pulse generator using a Mach-Zehnder (MZ) modulator, according to an embodiment of the invention.

FIG. 2 shows a system block diagram of a pulse generator using a Mach-Zehnder (MZ) modulator, according to an embodiment of the invention. As shown in FIG. 2, pulse generator 200 includes MZ modulator 210, which can be for example an MZ LiNbO$_3$ modulator. MZ modulator 210 receives continuous-wave (CW) light 201 and a clock signal 202 that includes a swing voltage and a voltage bias, and produces output optical pulses 203. The pulse generator 110 shown in FIG. 1 can be embodied by pulse generator 210 of FIG. 2. CW light 201 can be provided to MZ modulator 210, for example, by light source 100 of FIG. 1. The clock signal 202 can be provided to MZ modulator 210, for example, by adaptive phase and attenuation control 120.

In this embodiment, the temporal form of the pulse shape of output optical pulses 203 can be given by:

$$I_{out} = \sin[\alpha_1 + \alpha_2 \cos(2\pi t/T + \pi)], \quad (1)$$

where T is a bit period, t is time, $\alpha_1$ and $\alpha_2$ are variable parameters. When such a pulse shape is formed, for example, by passing CW light 201 through MZ modulator 210, $\alpha_1$ is the swing voltage and $\alpha_2$ is the voltage bias.

The appropriate selection of values for parameters $\alpha_1$ and $\alpha_2$ provides a pulse shape that is substantially optimal for particular fiber plant such as communication link 10 shown in FIG. 1. The term "optimal pulse shape" means a pulse shape that has reduced non-linear penalties, reduced inter-channel interference and reduced chromatic dispersion distortions of the signal as compared to other possible pulse shapes. As a result of using substantially optimal shape pulses in a communication system, the signal/noise ratio of the received signal is substantially maximized. The value of the signal/noise ratio in a fiber-optic communication system is usually described by the term Q-factor. Bit-error-rate (BER) is related to Q-factor as BER=$\exp(-Q^2/2)/(Q(2\pi)^{1/2})$ in the case of single detector. For example, a Q-factor value of 6 corresponds to a bit-error rate (BER) value of $10^{-9}$.

Figure 3:
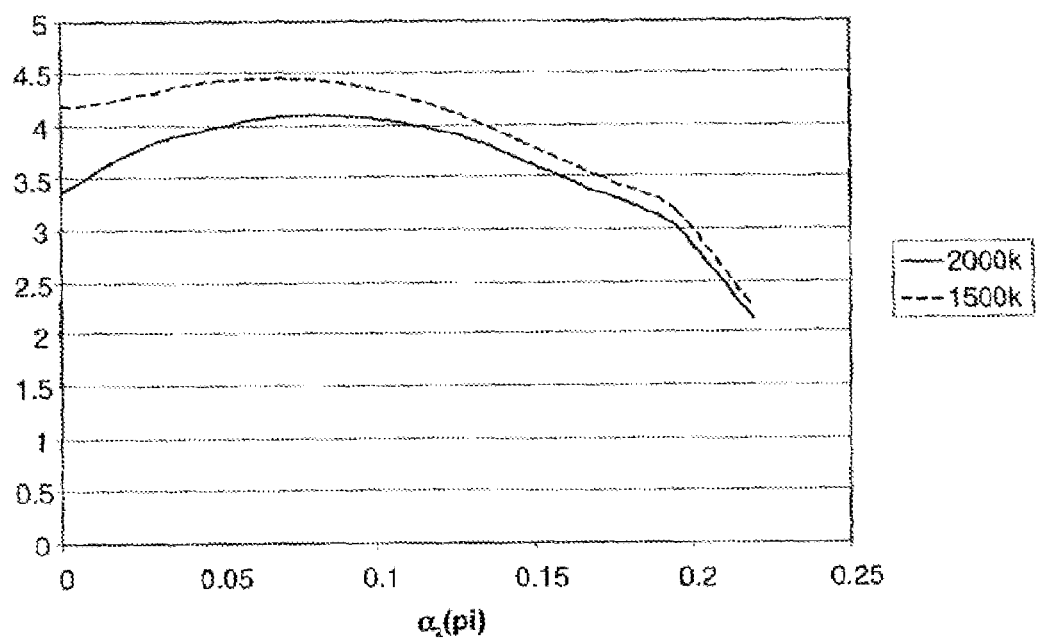
FIG. 3 shows Q-factor as a function of the pulse shape parameter $\alpha_2$ for two different transmission distances of 2000 and 1500 km.

A given value of the Q-factor depends, at least in part, on the selection of $\alpha_1$ and $\alpha_2$ provided to the MZ modulator 210. FIG. 3 shows two examples of a particular solution of the Q-factor as a function of $\alpha_2$, the voltage bias, according to the embodiment of the MZ modulator shown in FIG. 2. More specifically, FIG. 3 shows the values of the Q-factor as a function of $\alpha_2$, the voltage bias, for two long-haul (2000 km and 1500 km) optical communication systems using binary phase shift keying (BPSK) data modulation. As FIG. 3 illustrates, the value of the Q-factor can be optimized by selecting, among other things, an appropriate value of the voltage bias of the clock signal provided to MZ modulator 210 by adaptive phase and attention control 130. Although not shown in FIG. 3, the selection of the swing voltage also affects the value of the Q-factor.

Figure 4:
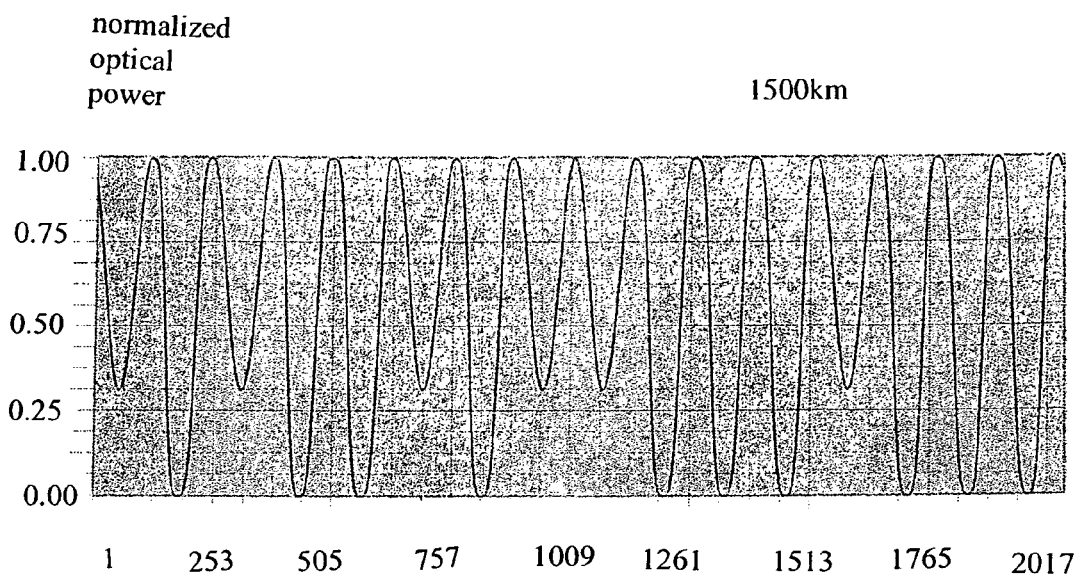
FIGS. 4 and 5 show the normalized amplitude versus time of data-modulated signals corresponding those referred to FIG. 3 for the 1500 km and 2000 km communication systems, respectively.
Figure 5:
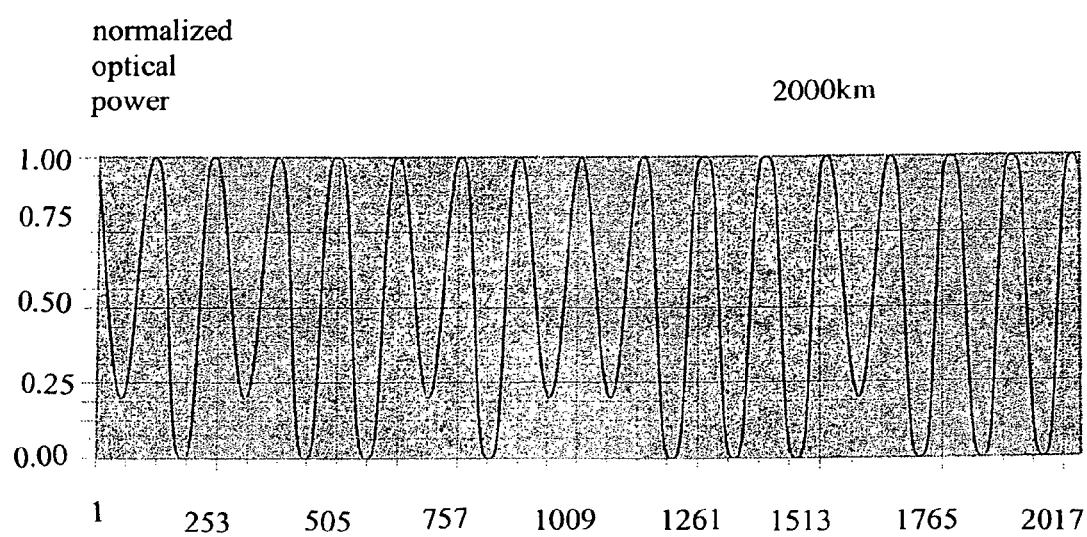

FIGS. 4 and 5 show the normalized amplitude versus time of data-modulated signals corresponding those referred to FIG. 3 for the 1500 kin and 2000 km communication systems, respectively. As FIGS. 4 and 5 show, the optimal pulse shape in this case is quasi-RZ signal. Simulations conducted by the inventors show that about the same values of $\alpha_1$ and $\alpha_2$ parameters will be appropriate for on-off-keying (OOK) data modulation format in long haul optical fiber communication. In this case of the OOK data modulation format, a quasi-RZ signal will also be a substantially optimal pulse shape. A pulse temporal form based on other smooth functions such as a Gaussian function and/or polynomials type of functions may also be used. A higher order Gaussian, such as super Gaussian, may also be used.

Other embodiments of the pulse generator are based on the formation of several harmonics of incoming CW light and the appropriate choice of the relative phase and amplitude of these spectral components. Although some of the embodiments described herein use three spectral components, a larger number of spectral components is also possible. Simulations conducted by the inventors show that the optimal pulse shapes for dense wavelength-division multiplexing (WDM) communication systems with phase modulation of data, quasi-RZ pulse shapes like those shown in FIGS. 4 and 5 for particular distances, can be formed by 5 spectral harmonics with the accuracy of about 2%, and by 3 spectral components with the accuracy of about 5%. These accuracies can be obtained by the appropriate selection of spectral components' amplitudes and relative phases. Alternatively, a variety of other pulse shapes based on smooth functions can be formed.

Figure 6A:
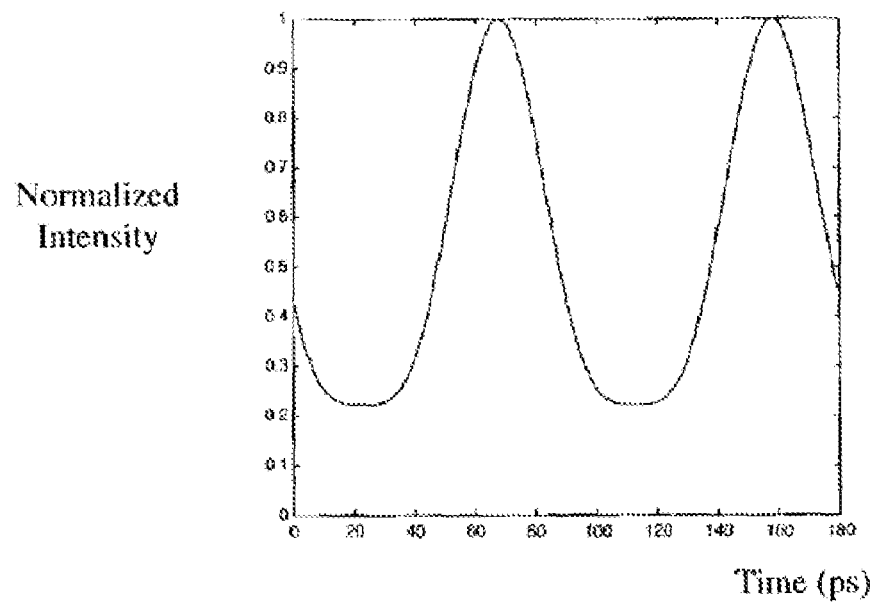
FIG. 6a shows the normalized intensity as a function of time for an example of quasi-RZ pulses having a linear chirp.
Figure 6B:
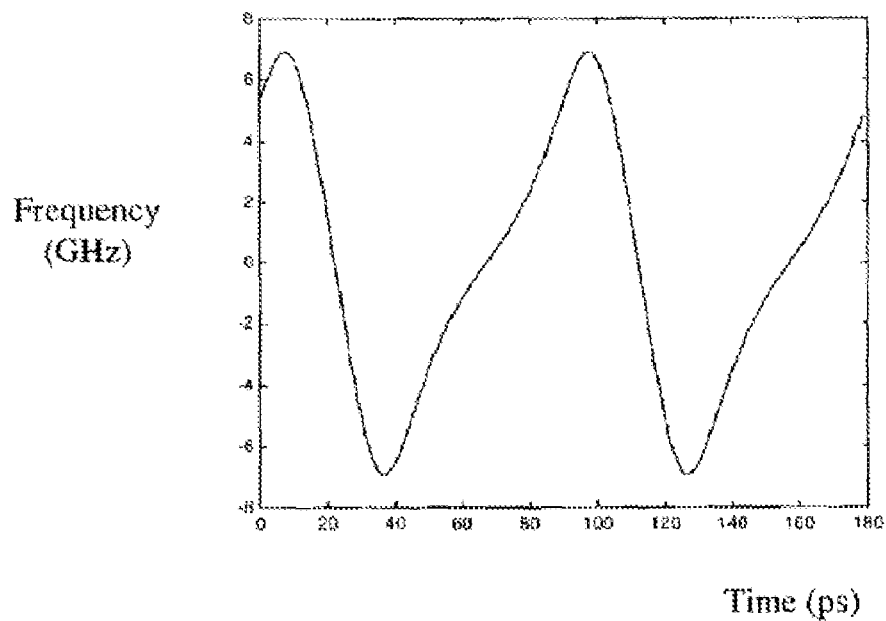
FIG. 6b shows the frequency versus time for the quasi-RZ pulses shown in FIG. 6b.

In another embodiment of the invention, the pulses formed by synthesis of several harmonics are pre-chirped. Pulse pre-chirping is widely used in fiber communications to compensate for chromatic dispersion of communication line (i.e., chromatic dispersion that occurs within the transmission fiber during propagation of light signals). In fiber communication links with compensated chromatic dispersion, some residual dispersion that varies due to environmental changes exists. The pulse pre-chirping can compensate for this residual dispersion. FIG. 6a shows the normalized intensity as a function of time for an example of quasi-RZ pulses having a linear chirp. FIG. 6b shows the frequency versus time for the quasi-RZ pulses shown in FIG. 6a. Three spectral harmonics with appropriate choice of relative amplitudes and phases were used to obtain this pulse shape and pulse pre-chirp.

Figure 7:
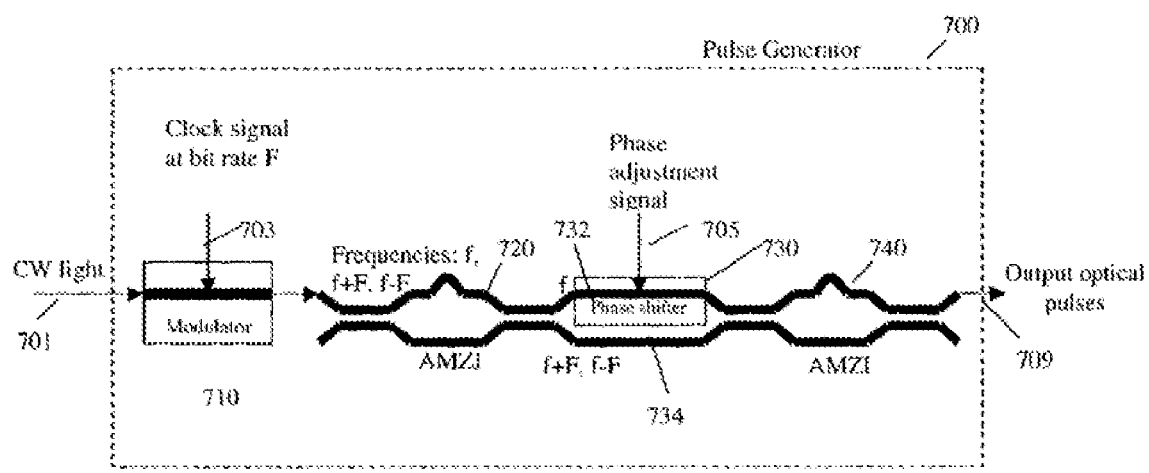
FIG. 7 shows a pulse generator, according to an embodiment of the invention.

In other embodiments of the invention, other types of devices and methods can be used to achieve a substantially optimal pulse shape and pulse pre-chirp. Unlike many known pre-chirping schemes where the pulse usually requires an additional fast phase modulator, certain embodiments of the invention described below do not require an additional fast phase modulator. For example, FIG. 7 shows a pulse generator, according to an embodiment of the invention. Pulse generator 700 includes an input modulator 710, an asymmetric MZ interferometer (AMZI) 720, phase shifter 730 and an AMZI 740. Input modulator 710 can be, for example, a phase or amplitude modulator. Although not shown in FIG. 7, pulse generator 700 can include an amplifier to drive the phase shifter 730.

CW light 701 of frequency f formed by, for example, a distributed feedback laser (for example, JDS Uniphase, model CQF935/508) (not shown in FIG. 7) is provided to input modulator 710. The input modulator 710 also receives a clock signal 703 with a bit rate F. The modulator 710 can be, for example, a JDS Uniphase LiNbO$_3$ MZ modulator model 10020427. The output signal from the modulator 710 includes the carrier and two strong side spectral components: f–F, f, f+F. The term "strong side spectral components" refers to spectral components f–F and f+F, which have non-trivial amplitudes (i.e., amplitudes above the noise floor).

The signal output from the modulator 710 is provided to AMZI 720, which acts as a demultiplexer and has, for example, a free spectral range (FSR) equal to 2F. AMZI 720 can be, for example, model M0013NPMFP-DPXA by NTT Electronics. AMZI 720 performs signal demultiplexing and divides the received light into different waveguides. Light having the spectral component with the frequency f is coupled into waveguide 732, and the light having the spectral components with frequencies f+F and f–F is coupled into waveguide 734.

Phase shifter 730 is coupled to waveguide 732 and receives a phase adjustment signal 705. Phase shifter 730 (for example, produced by JDS Uniphase LiNbO$_3$ MZ modulator model #10024520) introduces chirp by phase modulating the light having the spectral component with frequency f. Phase shifter 730 phase modulates the light propagating in waveguide 732 based on the phase adjustment signal 705. In this manner, the phase shifter 730 can introduce a desired chirp into the light having the spectral component with frequency f.

AMZI 740, having corresponding characteristics as AMZI 720, combines together the light. More specifically, AMZI 740 combines the light having frequency f, with the light having frequencies f+F and f–F to form output optical pulses 709 having a given pulse shape. In other words, similar to AMZI 720, which acts as a demultiplexer to separate the light having different spectral components into different waveguides, AMZI 740 acts as a multiplexer to recombine the light having different spectral components from these different waveguides to produce output optical pulses 709.

Figure 8:
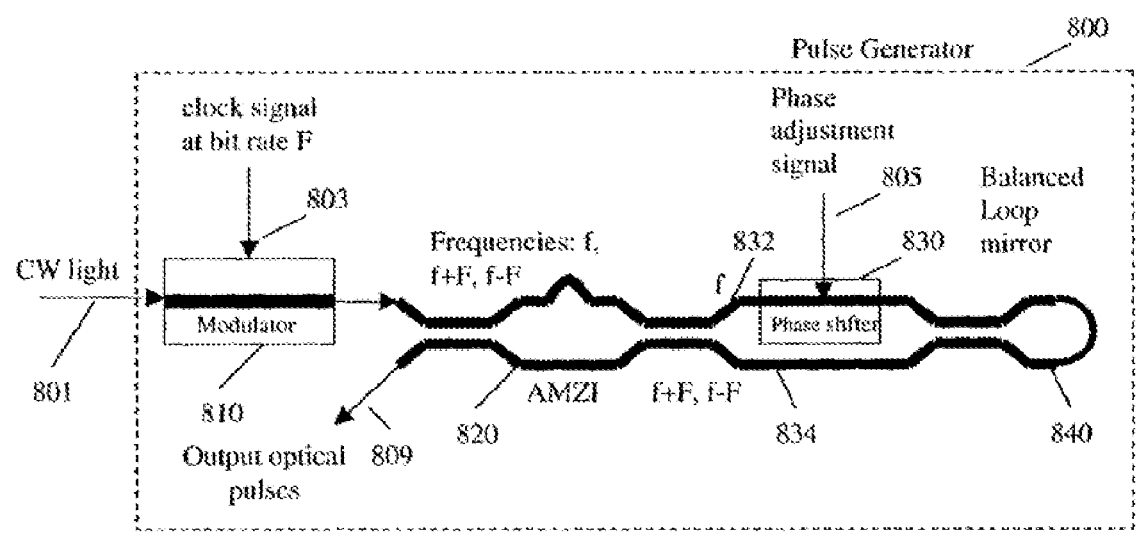
FIG. 8 shows a pulse generator, according to another embodiment of the invention.

FIG. 8 shows a pulse generator, according to another embodiment of the invention. Pulse generator 800 includes modulator 810, AMZI 820, phase shifter 830 and balanced loop mirror 840. Although not shown in FIG. 8, pulse generator 800 can include an amplifier to drive the phase shifter 830.

Modulator 810 receives CW light 801, for example, from light source 100 and receives a modulation signal 803 having a bit rate F. Modulator 810 produces light having three spectral components: f, f+F, and f−F. The light is then provided to AMZI 820 having, for example, a FSR of 2F. Carrier light having the spectral component with the frequency f is coupled into waveguide 832, and the light having the spectral components with frequencies f+F and f−F is coupled into waveguide 834. Phase shifter 830 phase modulates the light propagating in waveguide 832 based on the phase adjustment signal 805. In this manner, the phase shifter 830 can introduce a desired chirp into the light having the spectral component with frequency f.

After being modulated by phase shifter 830, the light from waveguide 832 and the light from waveguide 834 are reflected by balanced loop mirror 840. Thus, pulse generator 800 acts in a bi-directional manner. Instead of using a second AMZI (analogous to AMZI 740 shown in FIG. 7), AMZI 820 is used twice: once to split the light into waveguides 832 and 834, and once again to combine light returning from waveguide 832 and 834. The value of the phase modulation indicated by phase adjustment signal 805 and applied to the phase shifter 830 should be half that of phase adjustment signal 705 for the phase shifter 730 as shown in FIG. 7. This is due to the fact that the light passes through phase shifter 830 twice, once in each direction.

Figure 9:
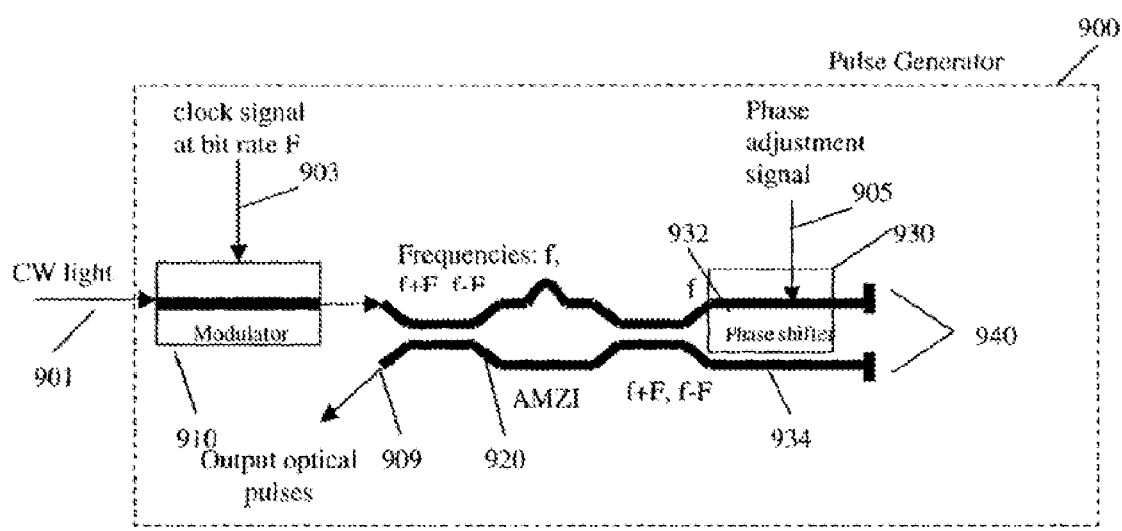
FIG. 9 shows a pulse generator, according to yet another embodiment of the invention.

FIG. 9 shows a pulse generator, according to yet another embodiment of the invention. Pulse generator 900 includes modulator 910, AMZI 920, phase shifter 930 and waveguides 932 and 934. Waveguides 932 and 934 each have an end with a high reflection coating. Pulse generator 900 is similar to pulse generator 800 of FIG. 8 where the balanced loop mirror 840 is replaced by the two high reflection coatings on the ends of waveguides 932 and 934. Although not shown in FIG. 9, pulse generator 900 can include an amplifier to drive the phase shifter 930.

For the embodiments shown in FIGS. 7-9, output optical pulses having a desired pulse shape can be produced without the use of phase-locked lasers. The shape of a generated pulse is controlled by the drive on the phase modulator (e.g., modulator 710, 810 and 910) while the chirp is controlled by the phase shifter (e.g., phase shifter 730, 830 and 930). Experiments conducted by the inventors have achieved a chirp of −0.2 GHz/ps. In these experiments, the driving voltage of the phase modulator (e.g., modulator 710, 810 and 910) was $V_{\pi/3}$ and the phase on the phase shifter (e.g., phase shifter 730, 830 and 930) was approximately 0.77. pi.

Figure 10:
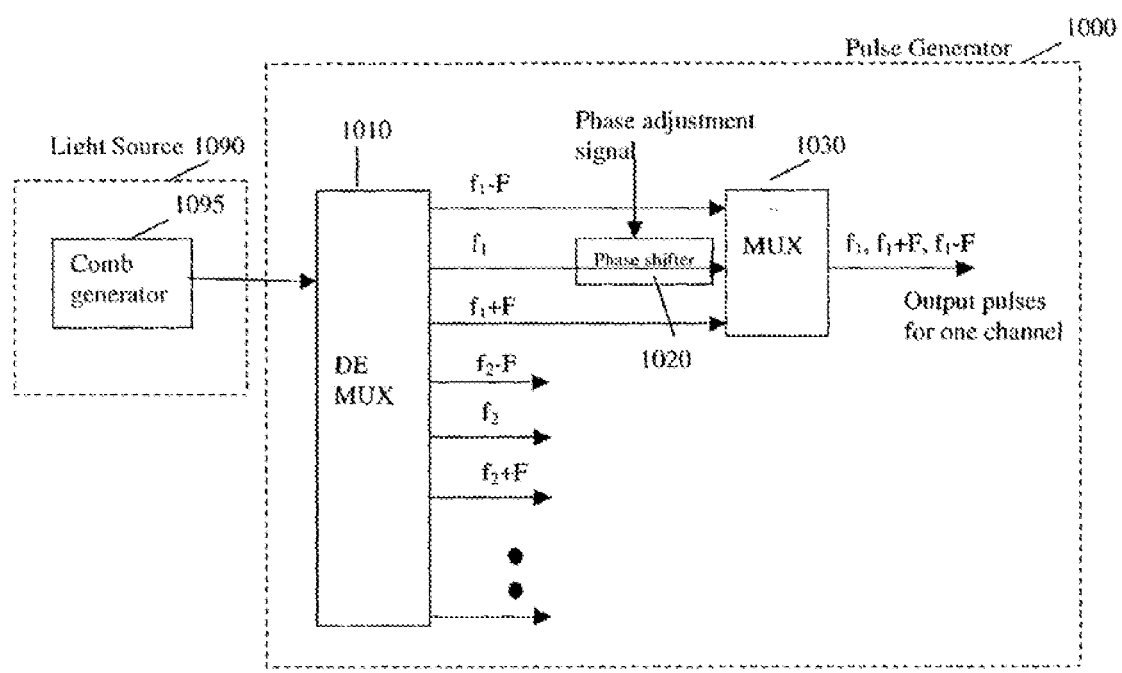
FIG. 10 shows a comb-generator light source and a pulse generator, according to another embodiment of the invention.

FIG. 10 shows a comb-generator light source and a pulse generator, according to another embodiment of the invention. The light source 1090 includes comb generator 1095. The pulse generator 1000 includes demultiplexer 1010, phase shifter 1020 and multiplexer 1030. Although only a single phase shifter 1020 and multiplexer 1030 are shown in FIG. 10, this shown phase shifter 1020 and multiplexer 1030 are associated with one communication channel. Thus, addition sets of phase shifters and multiplexers (not shown) can be associated with additional communication channels and included within pulse generator 1000.

In this embodiment, the light source 1090 can include a comb generator 1095 producing an output with, for example, evenly spaced apart frequencies as described, for example, in the U.S. patent application entitled "Light Source for generating output signal having equally spaced apart frequencies" filed on Jun. 18, 2002. Alternatively, other configurations of a comb generator can be used. Three, five or more spectral components of the output of the comb generator 1095 can be filtered from the remaining spectral components to create the pulses of one communication channel. Another set of spectral components can be used to form the pulses of another communication channel, and so on. Similar to the above-described embodiments of FIGS. 7 through 9, the embodiment shown in FIG. 10 using a comb generator can create the optical pulses with a substantially optimal shape and pre-chirp.

More specifically, light output from comb generator 1095 is demultiplexed by demultiplexer 1010. Three (or more) spectral components are used to create one communication channel. Phase shifters 1020 create the desired pulse shape for each communication channel. The parameters of these phase shifters 1020 can be controlled adaptively to follow the changes in the dispersion map and non-linear properties of the communication link (i.e., the optical transmission fiber).

In an alternative embodiment of a pulse generator, a portion of the pulse generator of FIG. 10 can be combined with a portion of the pulse generator of FIG. 7, 8 or 9. More specifically, a comb-generator light source can be coupled to a demultiplexer having an output channel bandwidth substantially equal to three (or more) spectral component of the comb-generator light source. In other words, each optical signal output from the demultiplexer has light with at least three spectral components associated with a particular information channel. Each optical signal output from the demultiplexer can be received by the first AMZI shown in FIG. 7, 8 or 9. This first AMZI can then isolate the light having one spectral component (e.g., light having the frequency f). A slow-phase modulator can then modulate the light. The light having the one spectral component and light having the remaining spectral components can then be combined to create the desired pulse shape in the respective communication channel.

The practical solutions for the pulse shape formation are not limited to these described embodiments. Many other embodiments are possible where the spectral components of the light are separated so that the light having at least one spectral component can be modified thereby creating a desired pulse shape.

The pulse generators described above can be used in conjunction with a pulse shape detector located at the receiver side of the communication system (e.g., pulse shape detector 20 as shown in FIG. 1). To close the loop and have the subsequently transmitted pulse shape be adapted based on the dispersion of the link (e.g., communication link 10), an error signal can be produced at the transmitter. This error signal should be a measure of the deviation from the nominal pulse shape due to the transmission of a pulse through the communication link. This can be accomplished in several ways such as, for example, measuring the pulse width using a standard method like oscilloscope or an autocorelator, and then modifying the pulse shape based on the difference between the desired value and the actual value as the error signal.

The difference between the desired pulse shape and the actually received pulse shape can be determined in a number of ways. For example, one embodiment described below uses an autocorrelator approach. Alternatively, the physical properties of the received pulse that are a strong function of the pulse width, such as the pulse's second optical harmonic or third optical harmonic, can be used. Regarding the second optical harmonic, see, for example, D. Yelin, D. Meshulach, and Y. Silberberg, "Adaptive femtosecond pulse compression", Opt. Letters, 1997, v.22, #23, pp. 1793-1795. Regarding the third optical harmonic, see, for example, D.

Meshulach, Y. Barad, and Y. Silberberg "Measurement of ultrashort optical pulses by third-harmonic generation", J. Opt. Soc. Am. B, vol. 14, #4, pp. 2122-2125. The magnitudes of these harmonics can be used as the error signal. Yet another way is to use a system monitor, like BER data or eye diagrams to produce the error signal.

Figure 11:
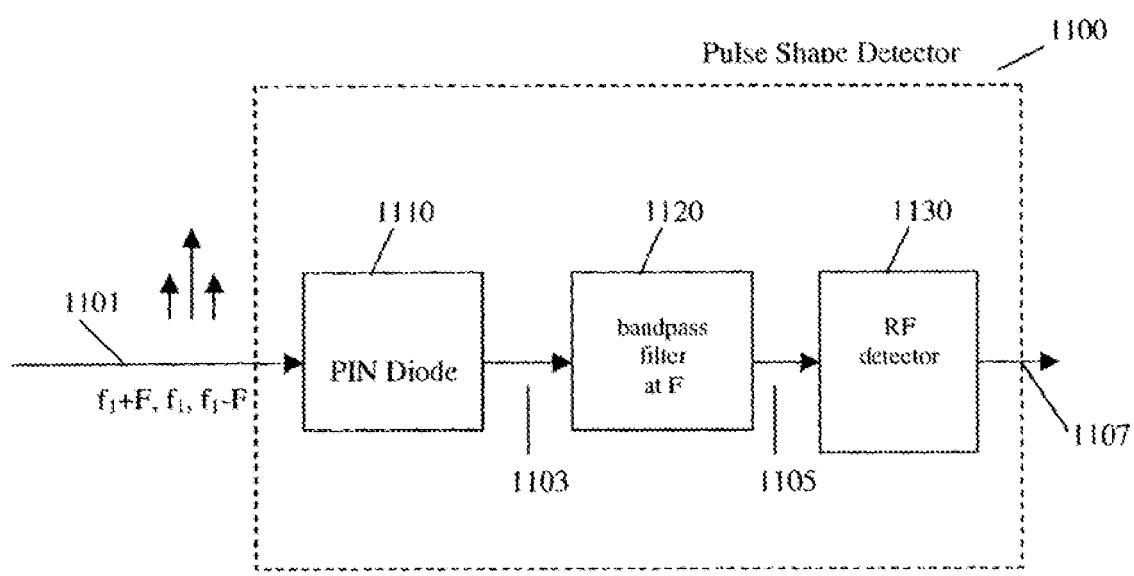
FIG. 11 shows a pulse shape detector according to an embodiment of the invention.

FIG. 11 shows a pulse shape detector according to an embodiment of the invention. In this embodiment, the magnitude of the detected microwave signal is used as a characteristic of the pulse width. More specifically, a signal having a clock frequency F (initially used at the pulse generator to modulate the light having a frequency f) is isolated and its magnitude is measured. This measured magnitude of the signal is correlated with the pulse width of the received optical signals.

The incoming optical signal 1101 includes at least three spectral components $f_{1-F}$, $f_1$, $f_{1+F}$ and is detected by PIN photodiode 1110. The electrical signal 1103 output from PIN photodiode 1110 includes a signal term that corresponds to the intensity of the optical signal 1101 at frequency F. Bandpass filter 1120 separates the spectral component at frequency F of signal 1103 from the remaining spectral components of signal 1103 to produce signal 1105. Bandpass filter 1120 can be tuned, for example, to frequency F. The intensity of signal 1105 is detected by RF detector 1130 to produce signal 1107.

Figure 12:
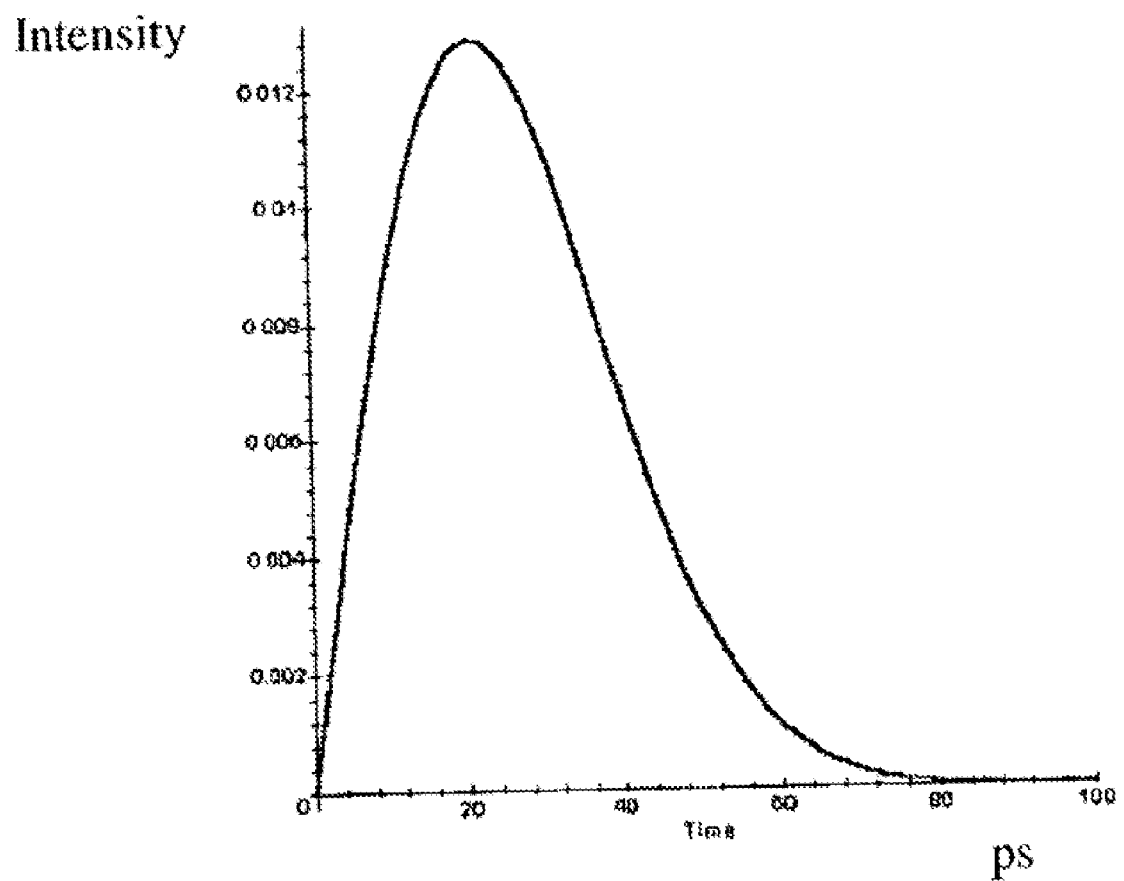
FIG. 12 show the time response (in ps) of the pulse shape detector shown in FIG. 11 for a modulation frequency F=12.5 GHz.

FIG. 12 show the time response (in ps) of the pulse shape detector shown in FIG. 11 for a clock frequency F=12.5 GHz. Under real operational conditions, only the right side of the curve in FIG. 12 is relevant because optical pulses shorter than 25 ps are not typical in optical communication systems. Consequently, a unique voltage can be assigned to each pulse width measured for received optical pulses. Thus, the time response shown in FIG. 12 can be used to define a desired error signal. Note that a modulation frequency of F=25 GHz corresponds to the minimal measurable pulse width equal to 12.5 ps.

For embodiments where the incoming optical pulse is phase modulated with data, the spectral content of the optical pulse becomes more complicated and can obstruct the proper operation of methods that depend on measuring the pulse width. Most communication systems, however, are designed so that un-modulated training pulses periodically occur. For example, in a 12.5 GHz pulse train, 30 pulses for every 1000 pulses can be un-modulated training pulses so that only few pulses-per-minute (ppm) will be dedicated to training pulses rather than pulses carrying data. This few number of un-modulated training pulses, however, can be sufficient to provide appropriate adaptive dispersion control when in the right pulse rate and with an effective signal-to-noise ratio.

Figure 13:
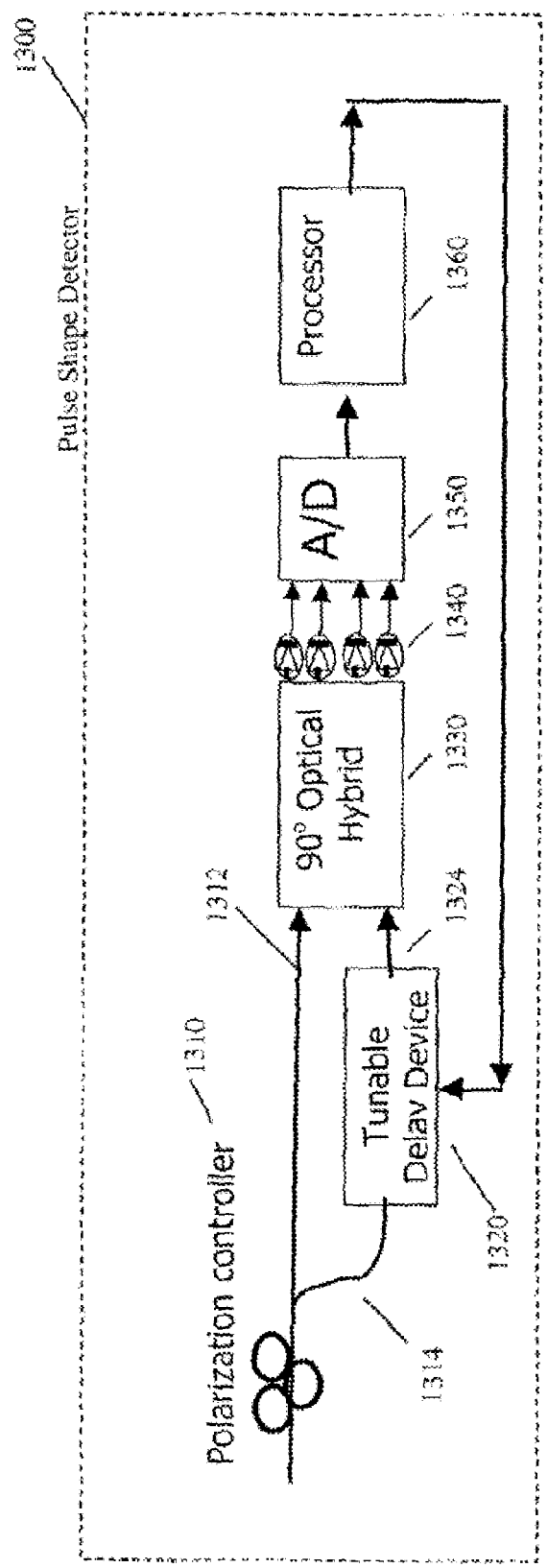
FIG. 13 shows a pulse shape detector based on autocorrelation, according to another embodiment of the invention.

FIG. 13 shows a pulse shape detector based on autocorrelation, according to another embodiment of the invention. In this embodiment, as described below, the width of the incoming optical pulse is measured not in one short measurement but through a series of measurements over multiple pulses.

Pulse shape detector 1300 includes polarization controller 1310 splitter (not shown), tunable delay device 1320, optical hybrid 1330, detectors 1340, analog-to-digital (A/D) converter 1350 and processor 1360. The polarization controller 1310 is coupled to tunable delay device 1320 and optical hybrid 1330. Tunable delay device 1320 is also coupled to optical hybrid 1330. Optical hybrid 1330 is coupled to detectors 1340, which are coupled to A/D converter 1340. A/D converter 1350 is coupled to processor 1360, which is coupled to tunable delay device 1320. Note that polarization controller 1310 is an optional component and need not be present in other embodiments.

The incoming optical pulses pass through polarization controller 1310 so that the optical pulses exiting the polarization controller 1310 have only a single polarization such as for example, only vertical polarization, horizontal polarization, clockwise circular polarization or counterclockwise circular polarization. Splitter (not shown) splits the exiting optical pulses onto two different optical paths 1312 and 1314. The optical pulses propagating on path 1314 are delayed by tunable delay 1320 relative to the optical pulses on optical path 1312 by a period of time that is a fraction of the typical pulse width. For example, tunable delay 1320 can introduce a delay of about {fraction (1/10)} of the pulse width. The optical pulses delayed by tunable delay device 1320 are output on optical path 1324.

The optical pulses propagating on optical paths 1312 and 1324 are received by optical hybrid 1330. Optical hybrid 1330 can be, for example, a 90-degrees optical hybrid similar to those used for the signal detection in coherent communication systems (see, for example, S. Betti, G. DeMarchis, E. Jannone "Coherent optical communications systems," John Wiley and Sons, Inc., 1995). Optical hybrid 1330 can be implemented, for example, in fiber, silica, $LiNbO_3$ or other materials. Although optical hybrid 1330 is shown in FIG. 13 as a 90-degrees hybrid with four outputs, other configurations are also possible.

The optical signals output from the optical hybrid 1330 are detected by detectors 1340, which can be for example photodiodes. Although detectors 1340 are balanced photodetectors, in other embodiments the detectors need not be balanced photodetectors. Detectors 1340 produce electrical signals based on the received optical signals and provide those electrical signals to A/D converter 1350. Although the embodiment in FIG. 13 shows four detectors 1340, other embodiments having a lesser or larger number of detectors are possible. The digital signals produced by A/D converter 1350 are provided to processor 1360, which can be for example a digital signal processor (DSP). For each received optical pulse, processor 1360 can calculate a digital signal that represents the extent to which the corresponding optical pulse on optical path 1312 and the corresponding optical pulse 1324 overlap. This digital signal can be stored in a buffer (not shown) that is accessible by processor 1360. The measured optical pulse corresponds to a particular delay applied by tunable delay device 1320.

The next measurement is based on a subsequently received optical pulse where the portion of light on optical path 1314 has a different delay applied by tunable delay device 1320. For example, a delay on an additional {fraction (1/10)} of a typical pulse width (e.g., {fraction (2/10)} for the second measured optical pulse) can be applied by tunable delay device 1320. Now, the extent to which the optical pulse portion on optical path 1312 and the optical pulse portion on optical path 1324 overlap will differ based on this new delay value. Processor 1360 produces another digital signal that represents this new overlap. This digital signal is again stored in the buffer accessible by processor 1360. This measurement procedure is repeated (i.e., an incrementally increased delay value is applied to subsequent optical pulses) until the optical pulse on optical path 1312 and the optical pulse on optical path 1324 substantially do not overlap. The effective pulse width is then calculated from the digital signals stored in the buffer.

The pulse shape detector based on autocorrelation and described in reference to FIG. 13 can find various applications in different fields. For example, a pulse shape detector based on autocorrelation can be used in optical communication systems regardless of the manner in which communication channels are multiplexed or the manner in which data is modulated. For example, a pulse shape detector based on autocorrelation can be used for optical signals in a wavelength-division multiplexing (WDM) system, a time-division multiple access (TDMA) system and a code-division multiple access (CDMA) system. In addition, a pulse shape detector based on autocorrelation can be used for optical signals having phase-modulated data, frequency-modulated data or amplitude-modulated data.

Moreover, the disclosed pulse shape detector based on autocorrelation is not limited to the pulse shapes having only three or more harmonics, but can be applied to variety of pulse shapes such as Gaussian or super-Gaussian pulse shapes. Because known devices that measure the autocorrelation function (i.e., the pulse width) of arbitrary short pulses are based on second harmonics generation crystals, the disclosed pulse shape detector based on autocorrelation can have a sensitivity on the order, more or less, of the known devices based on second harmonics generation crystals.

Figure 14:
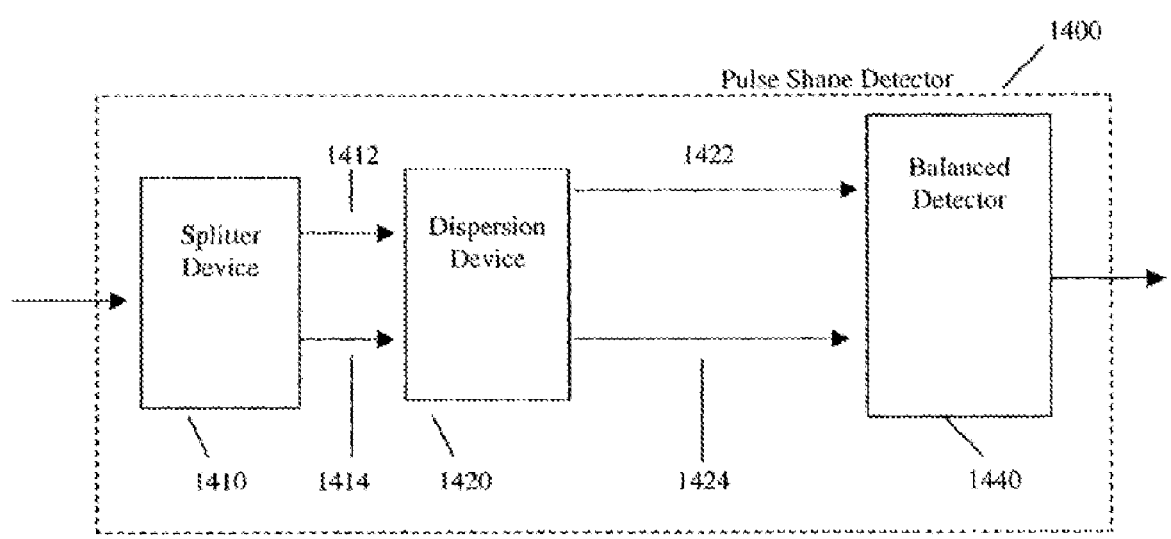
FIG. 14 shows a pulse shape detector, according to another embodiment of the invention.

FIG. 14 shows a pulse shape detector, according to another embodiment of the invention. As shown in FIG. 14, pulse shape detector 1400 includes a splitter device 1410, a dispersion device 1420 and a balanced detector 1430. Splitter device 1410 is coupled to dispersion device 1420 by optical paths 1412 and 1414. Dispersion device 1420 is coupled to balanced detector 1430 by optical paths 1422 and 1424. In alternative embodiments where the split optical path lengths differ (e.g., the length of optical paths 1412 and 1422 on the one hand differ from the length of optical paths 1414 and 1424 on the other hand), a tunable delay device can be disposed within one of the optical paths.

Figure 15:
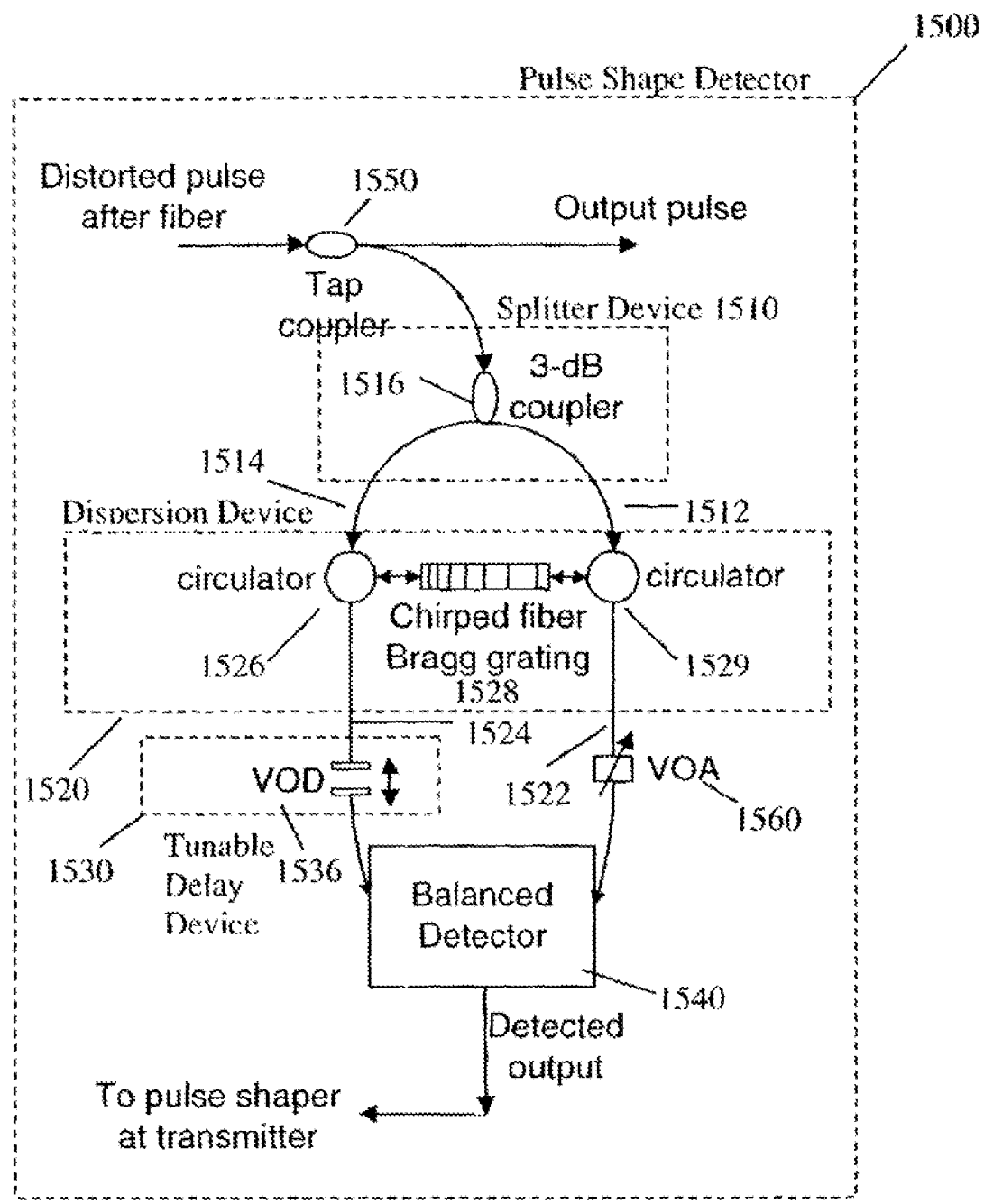
FIG. 15 shows a pulse shape detector with single chirped fiber Bragg grating, according to an embodiment of the invention.

Splitter device 1410 receives an optical signal and divides the optical signal onto two separate optical paths 1412 and 1414. The dispersion device 1420 introduces a dispersion having one sign onto optical path 1422 and the same amount of dispersion but with the opposite sign onto optical path 1424. In this embodiment, the dispersion device 1420 can be based on, for example, a chirped fiber Bragg grating. FIG. 15 shows a pulse shape detector with single chirped fiber Bragg grating, according to an embodiment of the invention.

As shown in FIG. 15, pulse shape detector 1500 includes tap coupler 1550, splitter device 1510, dispersion device 1520, tunable delay device 1530, variable optical attenuator (VOA) 1560 and balanced detector 1540. Note that tunable delay device 1530 and VOA 1560 are optional. Splitter device 1510 includes a 3-db coupler 1516. Dispersion device 1520 includes circulator 1526, chirped fiber Bragg grating 1528 and circulator 1529. Tunable delay device 1530 includes a variable optical delay (VOD) 1536. Although not explicitly shown, a low pass filter can be added to the pulse shape detector 1500 to suppress unwanted noise.

A small portion of the distorted optical pulse (i.e., the received optical signal after being transmitted through the communication link) is separated for the pulse shape measurement. This small optical portion of the distorted pulse is separated, for example, by tap coupler 1550, which can be for example a 10:90 coupler. The remaining portion of the distorted optical pulse can be provided to the receiver for detecting the modulated data. The 3-dB coupler 1516 of splitter device 1510 splits the light onto two optical paths 1512 and 1514.

Dispersion device 1520 then introduces a certain amount of dispersion into the optical signals on each of these optical paths. More specifically, chirped fiber Bragg grating 1528 with circulator 1526 introduces a certain amount of dispersion onto the optical pulses propagating on optical path 1514. Similarly, chirped fiber Bragg grating with circulator 1529 introduces an equal amount of dispersion, but with an opposite sign, onto the optical pulses propagating on optical path 1512. In this embodiment, the optical signals from both optical paths 1514 and 1512 are reflected by the same chirped fiber Bragg grating 1528. Because these optical signals are reflected from the opposite sides of the grating 1528, the sign of the introduced chirp is opposite for the pulses from optical path 1514 and the pulses from optical path 1512. The amount of chirp introduced is the same for both optical paths 1514 and 1512.

In an alternative embodiment, the same chirp can be introduced by two independent chirped fiber Bragg gratings each being a piece of fiber with the required dispersion characteristics. In this alternative embodiment, one chirped fiber Bragg grating can be coupled to one optical path and the other chirped fiber Bragg grating can be coupled to the other optical path.

Returning to FIG. 15, dispersion device 1520 provides the optical signals onto optical paths 1524 and 1522. VOA 1536 is coupled to optical path 1522 and is configured to vary the optical power of optical signals propagating on optical path 1522. By varying the optical power of optical signals propagating on optical path 1522, the optical power of the optical signals can be balanced before being received at balanced detector 1540. VOD 1536 is coupled to optical path 1524 and provides a variable optical delay for synchronizing the optical signals received at the detector so that an incremental delay is applied as described in FIG. 14. The bandwidth of the balanced detector can be, for example, close to the symbol rate of the data represented by the received optical signals.

Figure 16:
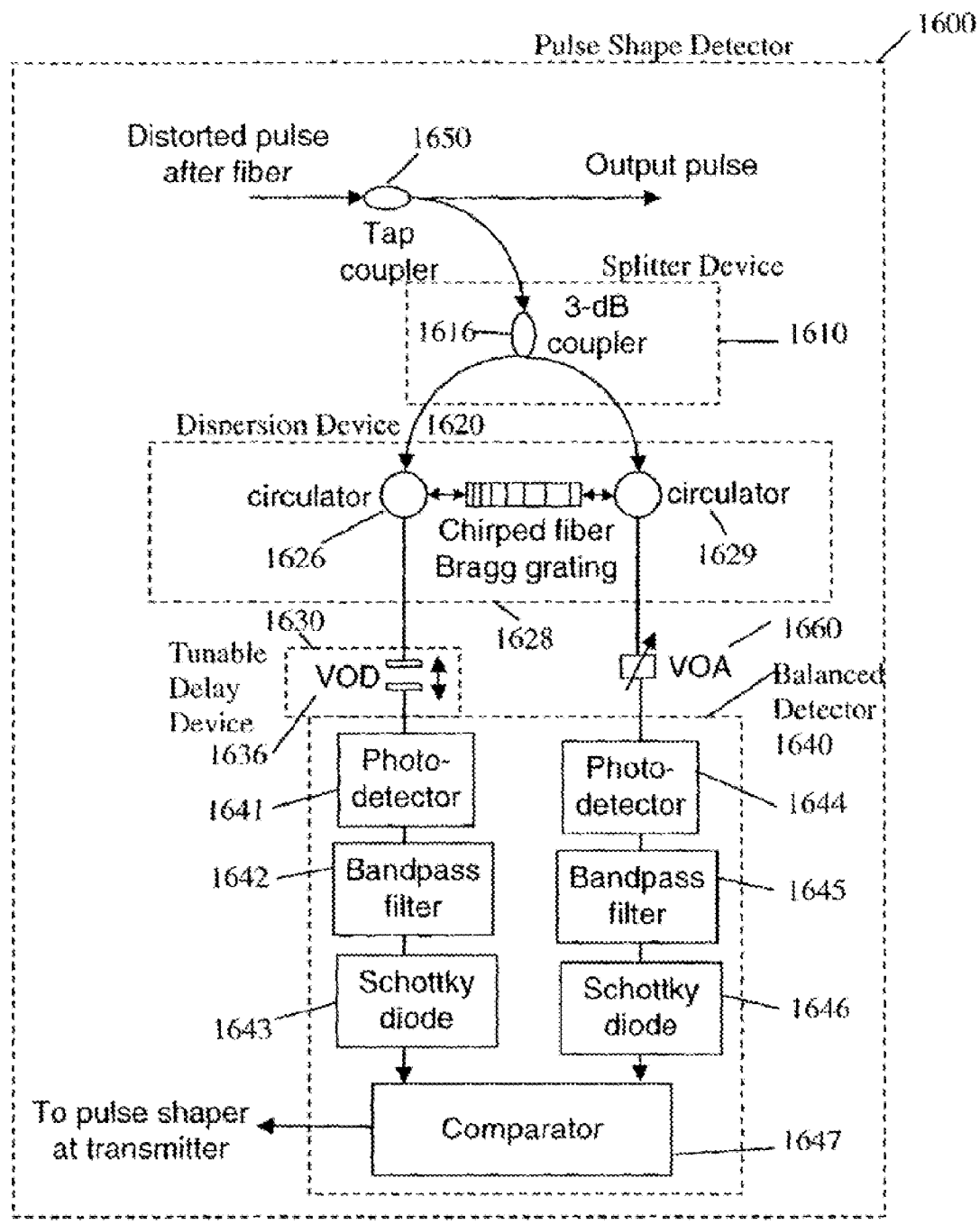
FIG. 16 shows a pulse shape detector with single chirped fiber Bragg grating, according to another embodiment of the invention.

FIG. 16 shows a pulse shape detector with single chirped fiber Bragg grating, according to another embodiment of the invention. As shown in FIG. 16, pulse shape detector 1600 includes tap coupler 1650, splitter device 1610, dispersion device 1620, tunable delay device 1630, VOA 1660 and balanced detector 1640. Note that tunable delay device 1630 and VOA 1660 are optional. Splitter device 1610 includes a 3-db coupler 1616. Dispersion device 1620 includes circulator 1626, chirped fiber Bragg grating 1628 and circulator 1629. Tunable delay device 1630 includes a variable optical delay (VOD) 1636. Balanced detector 1640 includes photodetectors 1641 and 1644, bandpass filters 1642 and 1645, Schottky diodes 1643 and 1646, and comparator 1647. Although not explicitly shown, a low pass filter can be added to the pulse shape detector 1600 to suppress unwanted noise.

Pulse shape detector 1600 is similar to pulse shape detector 1500 shown in FIG. 15 except that balanced detector 1640 includes two photodetectors, one on each of the optical paths. More specifically, photodetector 1641 is coupled to VOD 1636 and coupled in series to bandpass filter 1642 and Schottky diode 1643. Similarly, photodetector 1644 is coupled to VOA 1660 and coupled in series to bandpass filter 1645 and Schottky diode 1646. Both Schottky diodes 1643 and 1646 are coupled to comparator 1647.

The pulse shape detectors shown in FIGS. 14 through 16 can provide an error signal that indicates the amount of correction that the transmitter can subsequently apply to send an optical pulse having a substantially optimal pulse shape. In other words, the signal output by the balanced detector can be used as an error signal at the receiver side of the communication link. If the pulse generator at the transmitter side forms the pre-chirped pulse in such a manner that the pulse has spectrally symmetric shape after transmission through fiber (i.e., communication link), both signals input into the balanced detector will have the same value. In such a case, correction at is not needed. However, if the signals input into the balanced detector have different values, a corresponding correction is can be provided via the error signal to the transmitter (e.g., to computer 130, which controls adaptive phase and attenuation control 120 and pulse generator 110 as shown in FIG. 1) so that a subsequently sent optical pulse has a substantially optimal pulse shape.

Figure 17A:
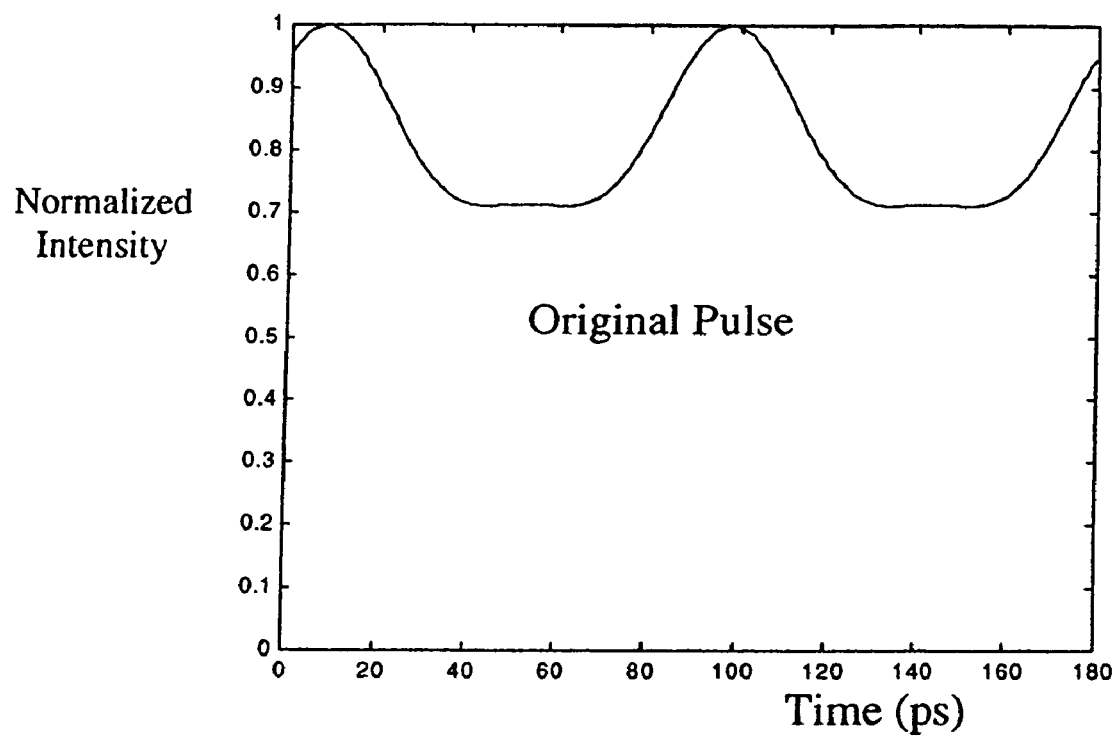
FIGS. 17a through 17d shows an example of a series of pulse trains as an original distorted pulse shape is adaptively corrected, resulting from the method described in connection with FIG. 18.
Figure 17B:
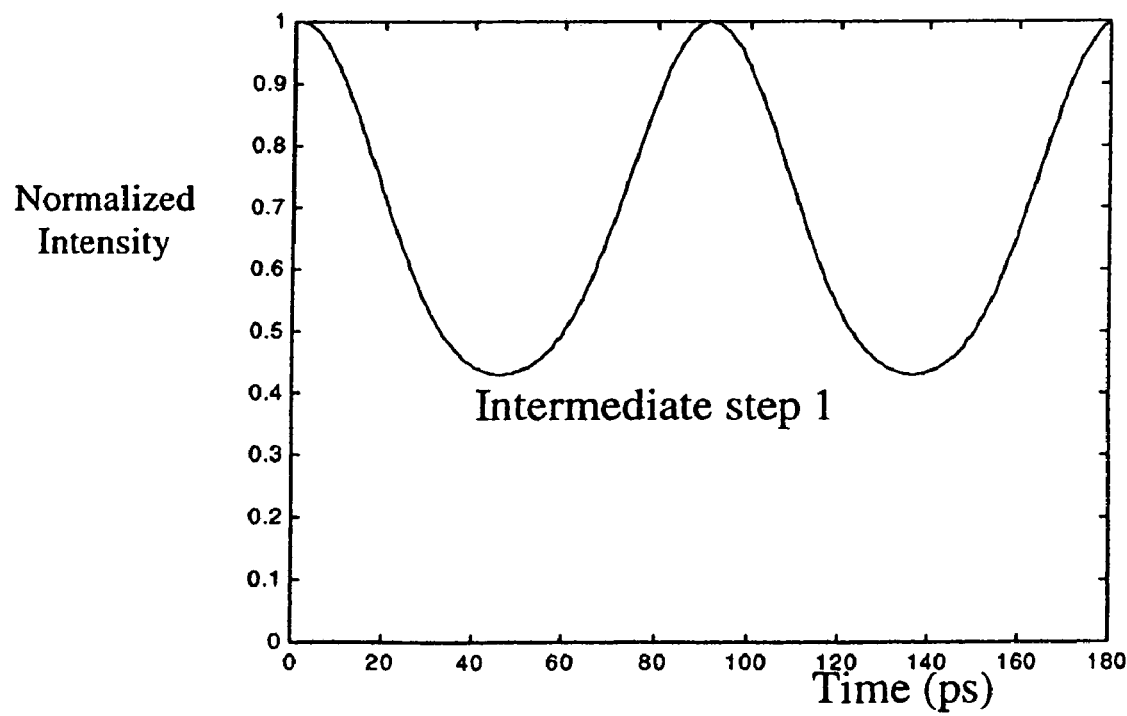
Figure 17C:
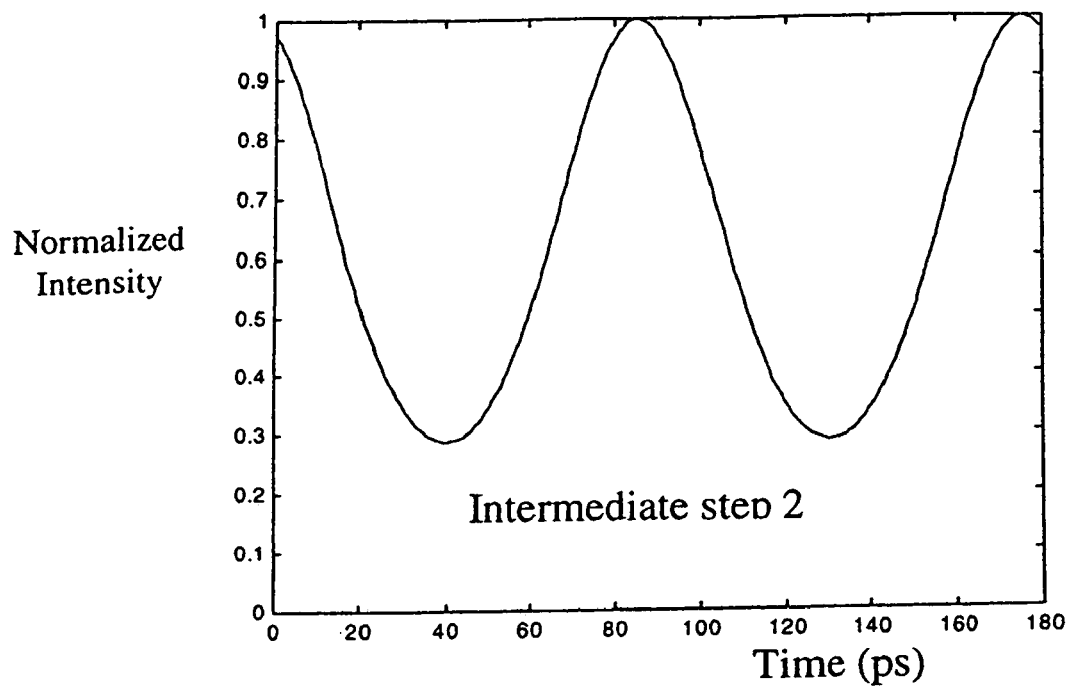
Figure 17D:
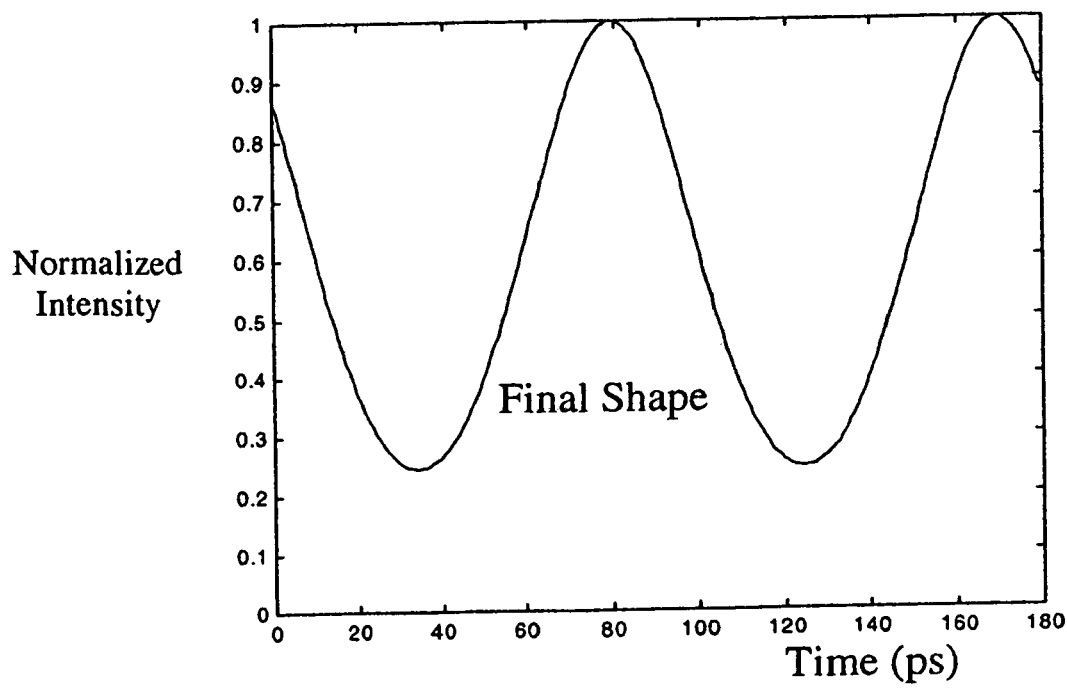

In one embodiment, the computer at the transmitter (e.g., computer 130 shown in FIG. 1) can analyzes the output signal from the pulse shape detector at the receiver, and adaptively tune the parameters of optical pulse generator at the transmitter side to correct the pulse shape. This correction of the pulse shape can overcome distortions to the transmitted pulse caused by chromatic dispersion, nonlinear effects and inter-channel interference. The result of the work of such software is shown in FIG. 17. FIG. 17a shows the received original pulse train with distorted pulse shapes (i.e., without any correction). FIG. 15b shows the pulse train after several iterations for pulse reconstruction. FIG. 15c shows the pulse train after even more iterations. FIG. 15d shows the reconstructed pulse train, which substantially coincides in shape with initial one. The pulse shapes were substantially completely reconstructed as a result of the application of correction algorithm.

Figure 18:
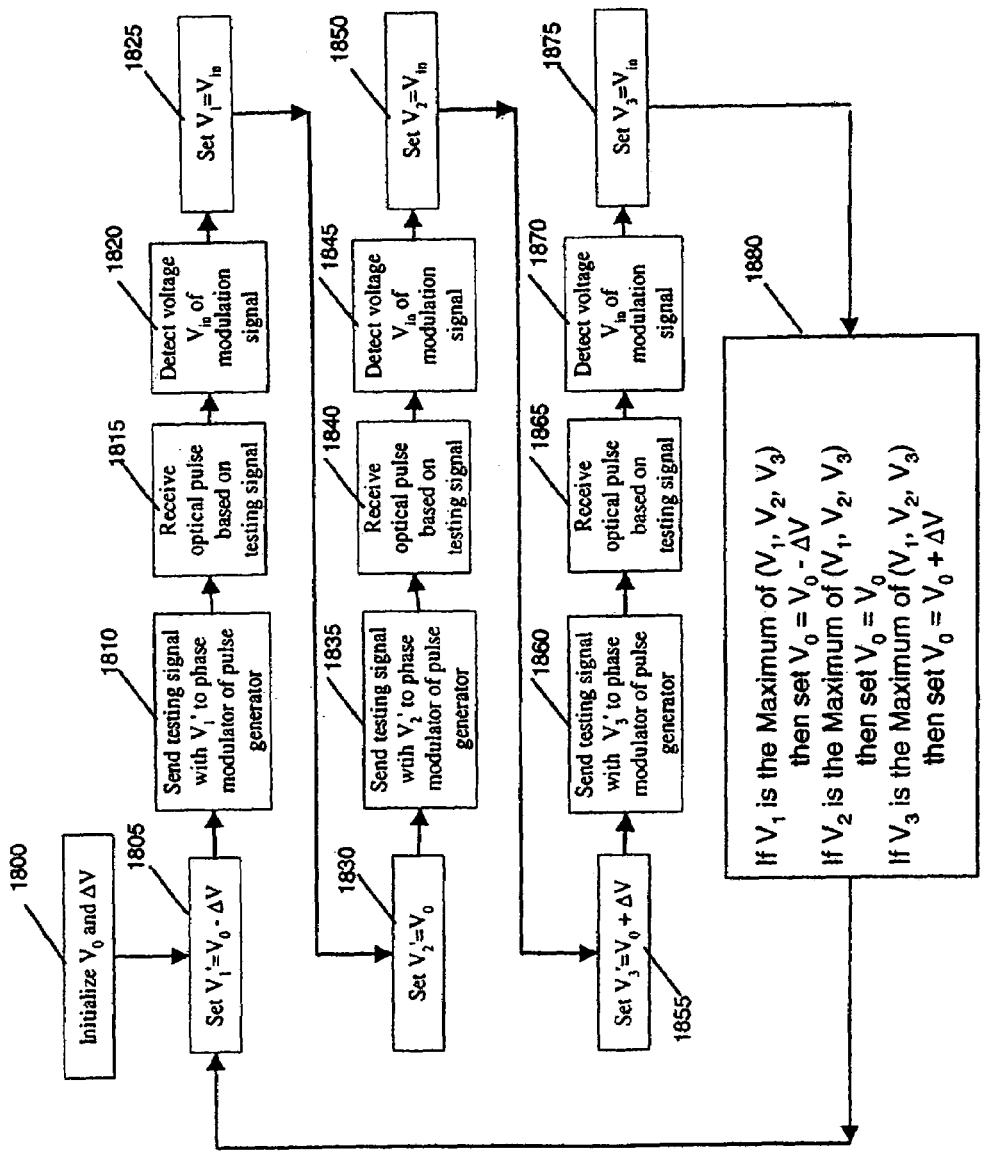
FIG. 18 shows a flowchart of a method for adaptive shape correction, according to an embodiment of the invention.

FIG. 18 illustrates a flowchart of the method for adaptive pulse shaping, according to an embodiment of the invention. This method can be implemented, for example, by computer 130 and adaptive phase and attenuation control 120, shown in FIG. 1. The method is based on the maximizing of the power of the optical signal portion having the spectral component with frequency F. Maximal magnitude of the signal at frequency F means that both (f+F) and (f−F) spectral components are in phase with the signal at main frequency f. For condition to be satisfied, the chirp introduced by the modulator at the pulse generator at the transmitter is just correct to compensate the dispersion of the fiber, and no phase shift exists between the signal portion having the spectral component f and the signal portion having the spectral components (f+F) and (f−F) at the receiver point.

This dithering method can be implemented, for example, on a microprocessor or personal computer (e.g., computer 130 shown in FIG. 1) to control the pulse generation by maximizing the voltage output of the pulse shape detector (e.g., pulse shape detector 20). The analog voltage output of the power detector can be sampled and quantified to digital signal by an A/D converter (not shown). The computer (or microprocessor, e.g., computer 130) can then maximize this feedback signal by the dithering method depicted in FIG. 18. The D/A converter (not shown) converts the digital output signal from this method to an analog signal, which controls the phase modulator (e.g., within pulse generator 110).

As shown in FIG. 18, at step 1800, a center voltage, $V_0$, and a dither voltage, $\Delta V$, are initialized. At step 1805, a voltage, $V_{1'}$, is set to the center voltage, $V_0$, minus the dither voltage, $\Delta V$. At step 1810, the testing signal with $V_{1'}$ is sent to the phase modulator of the pulse generator (e.g., modulator 732 of pulse generator 700 shown in FIG. 7). At step 1815, the optical pulse based on the testing signal is received (for example, at pulse shape detector 20 as shown in FIG. 1). At step 1820, the voltage $V_{in}$ of the modulation signal is detected. At step 1825, the obtained value $V_{in}$ is saved in $V_1$ buffer.

At step 1830, a voltage, $V_{2'}$, is set to the center voltage, $V_0$. At step 1835, the testing signal with $V_{2'}$ is sent to the phase modulator of the pulse generator (e.g., modulator 732 of pulse generator 700 shown in FIG. 7). At step 1840, the optical pulse based on the testing signal is received (for example, at pulse shape detector 20 as shown in FIG. 1). At step 1845, the voltage $V_{in}$ of the modulation signal is detected. At step 1850, the obtained value $V_{in}$ is saved in $V_2$ buffer.

At step 1855, a voltage, $V_{3'}$, is set to the center voltage, $V_0$, plus the dither voltage, $\Delta V$. At step 1860, the testing signal with $V_{3'}$ is sent to the phase modulator of the pulse generator (e.g., modulator 732 of pulse generator 700 shown in FIG. 7). At step 1865, the optical pulse based on the testing signal is received (for example, at pulse shape detector 20 as shown in FIG. 1). At step 1870, the voltage $V_{in}$ of the modulation signal is detected. At step 1875, the obtained value $V_{in}$ is saved in $V_3$ buffer.

At step 1880, a determination is made as to which voltage $V_1$, $V_2$ or $V_3$ is the maximum. If $V_1$ is the maximum of $V_1$, $V_2$ and $V_3$, then the center voltage, $V_0$, will be decreased by the dither voltage, $\Delta V$. If $V_2$ is the maximum of $V_1$, $V_2$ and $V_3$, then the center voltage, $V_0$ remains with the same value. If $V_3$ is the maximum of $V_1$, $V_2$ and $V_3$, then the center voltage, $V_0$, will be increased by the dither voltage, $\Delta V$.

Figure 19:
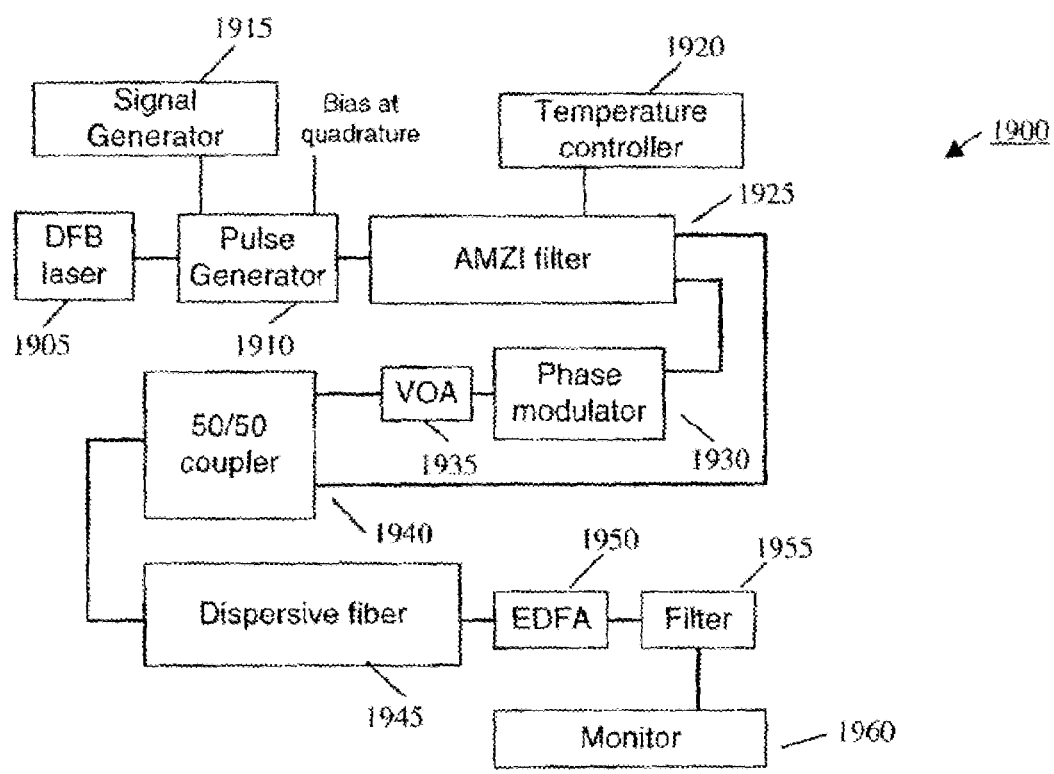
FIG. 19 shows the test setup for measuring pulse propagation in a link with significant dispersion, according to an embodiment of the invention.

FIG. 19 shows the test setup for measuring pulse propagation in a link with significant dispersion using pulse shape correction, according to an embodiment of the invention. More specifically, the test setup 1900 includes a distributed feedback (DFB) laser 1905, pulse generator 1910, signal generator 1915, temperature controller 1920, AMZI filter 1925, phase modulator 1930, VOA 1935, coupler 1940, dispersive fiber 1945, erbium-doped fiber amplifier (EDFA) 1950, filter 1955 and oscilloscope/OSA 1960. As shown in FIG. 19, the pulse generator is based on the embodiment shown in FIG. 7. The test setup 1900 allows the comparison of the propagation of pulse-shape-corrected pulses and non-pulse-shape-corrected pulses.

DFB laser 1905 can provide an optical signal having an optical carrier ($f_o$) to pulse generator 1910. Pulse generator 1910 can be based on, for example, the embodiment shown in FIG. 7. Pulse generator 1910 can include, for example, a MZ modulator driven by a 6.25 GHz sinusoidal wave that generates two 6.25 GHz tones (.+−.F) around 1546.9 nm of the optical carrier ($f_o$) received from DFB laser 1905. The amplitude-modulated signal produced by pulse generator 1910 is then fed to an AMZI filter 1925, which can have, for example, a FSR of 12.5 GHz. The outputs of AMZI filter 1925 are sent to coupler 1940 (e.g., a 50/50 coupler) and to phase modulator 1930, which is coupled in turn to VOA 1935. AMZI 1925, phase modulator 1930, VOA 1935 and coupler 1940 have polarization maintaining (PM) fibers.

The output of coupler 1940 represents the output of a transmitter and is directed to dispersive fiber 1945 (e.g., having about −850 ps/nm dispersion). The output from dispersion fiber 1945 is amplified by EDFA 1950 and filtered by filter 1955 before being monitored by monitor 1960. Monitor 1960 can be for example an oscilloscope and an optical spectrum analyzer (OSA).

Figures 20A, 20B:
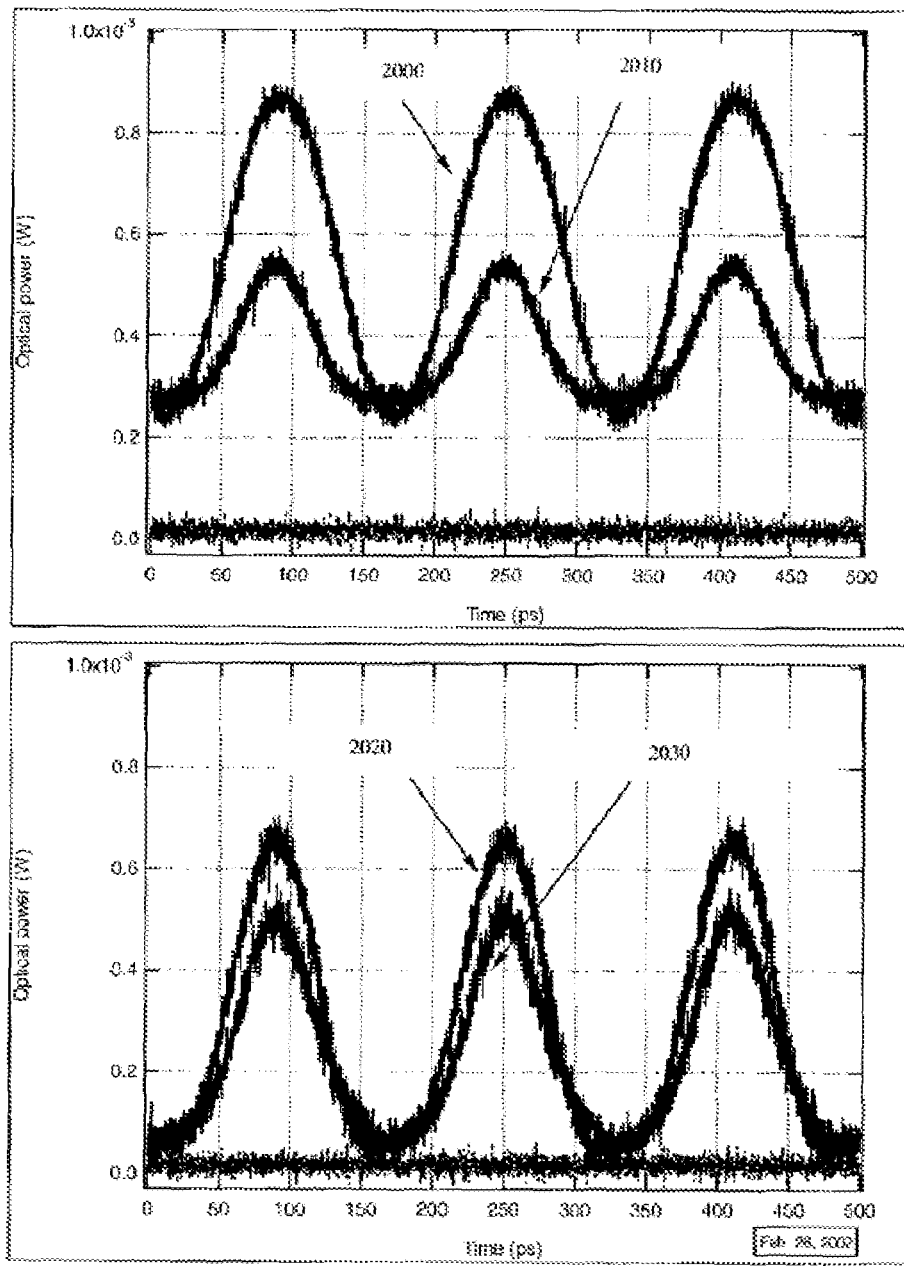
FIGS. 20a and 20b show an example of the output pulse waveform on an oscilloscope based on the test setup of FIG. 22.
Figure 21A:
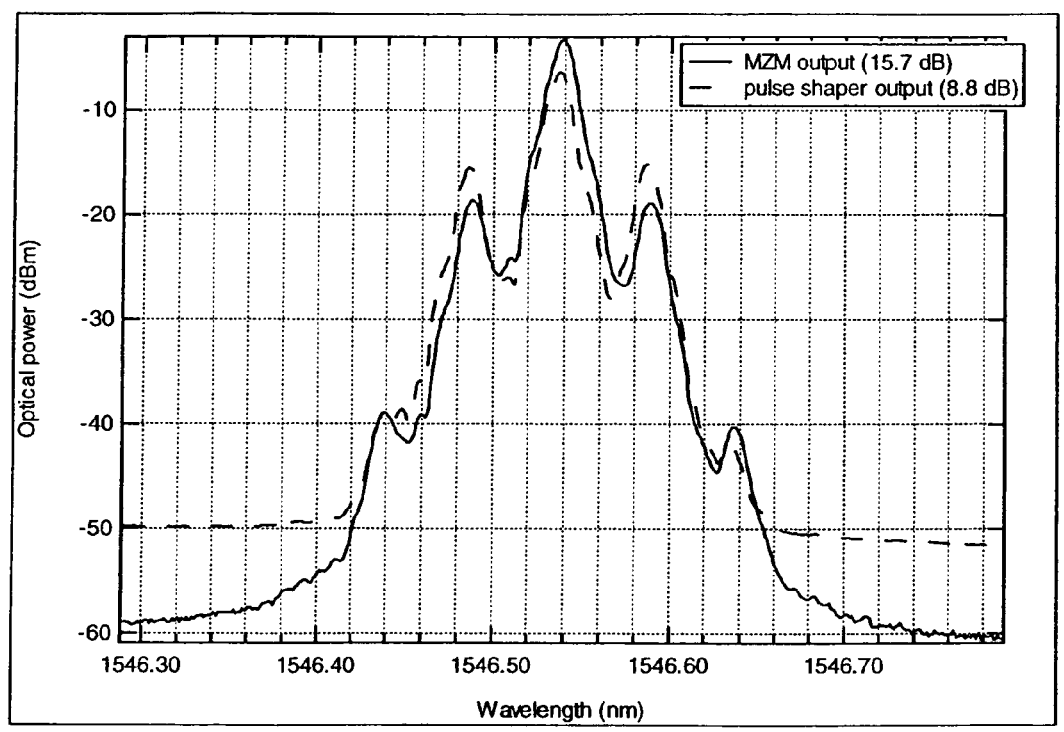
FIGS. 21a and 21b show an example of the output pulse spectrum on an OSA corresponding to the output pulse waveform shown in FIGS. 20a and 20b.
Figure 21B:
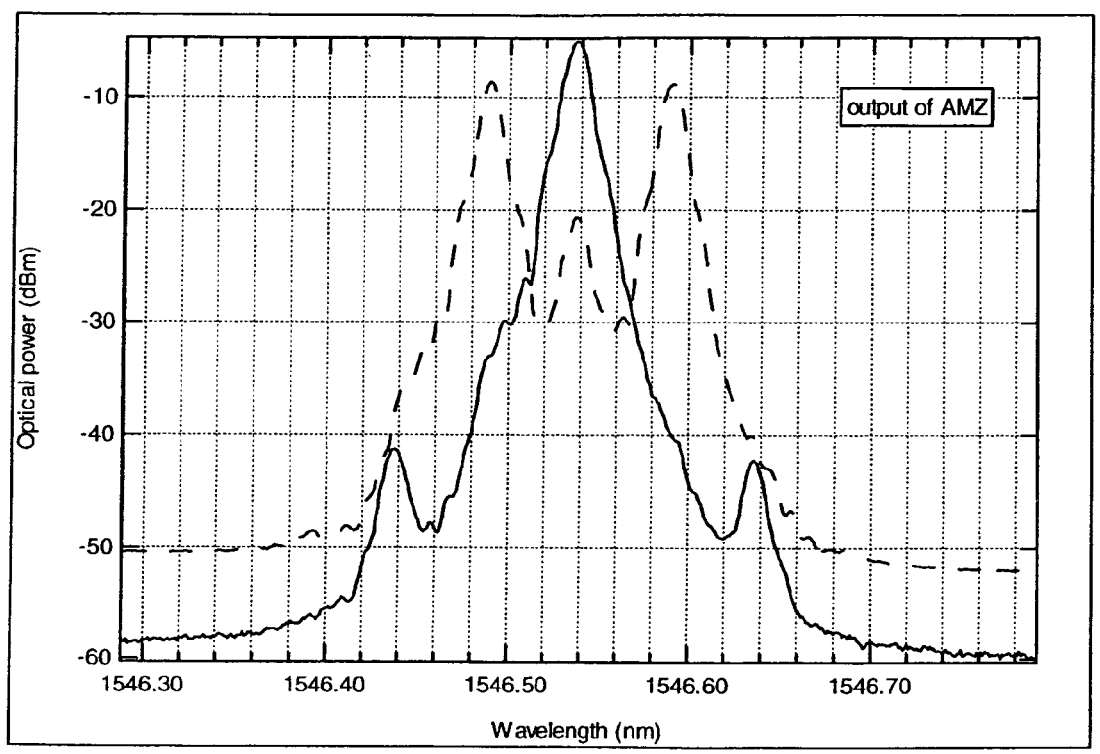

FIGS. 20a and 20b show an example of the output pulse waveform on an oscilloscope based on the test setup of FIG. 19. FIGS. 21a and 21b show an example of the output pulse spectrum on an OSA corresponding to the output pulse waveform shown in FIGS. 20a and 20b.

As shown in FIG. 20a, signal 2000 is the pulse output of the pulse generator shown at 6.25 GHz with a contrast ratio of 5.4 dB. The carrier-to-sideband ratio is about 15.7 dB as can be seen in FIG. 21a. Signal 2010 is the distorted pulse after propagating through dispersion fiber 1945. The contrast ratio of the distorted pulse is reduced to 2.9 dB (down from 5.4 dB for the undistorted pulse (signal 2000) transmitted from the pulse generator 1910).

FIG. 20b shows the output pulse waveforms after being corrected. Signal 2020 is the output pulse waveform output from the pulse generator 1910 based on a pulse shaping correction. Signal 2030 is the output pulse waveform of an optical pulse having undergone a pulse-shaping correction and after propagating through dispersive fiber 1945. As FIG. 20*b* shows, the pulse that underwent a pulse-shaping correction is greatly improved over the pulse without pulse-shaping correction. More specifically, the pulse that underwent a pulse-shaping correction has a much higher contrast ratio even after propagating through the dispersive fiber 1945. The carrier-to-sideband ratio of the pulse output from the transmitter is 8.8 dB as shown in FIG. 21*b*. As these experimental results show, the waveform and spectrum for the shaped pulses are subjected to much less distortions due to the link dispersion.

Figure 22:
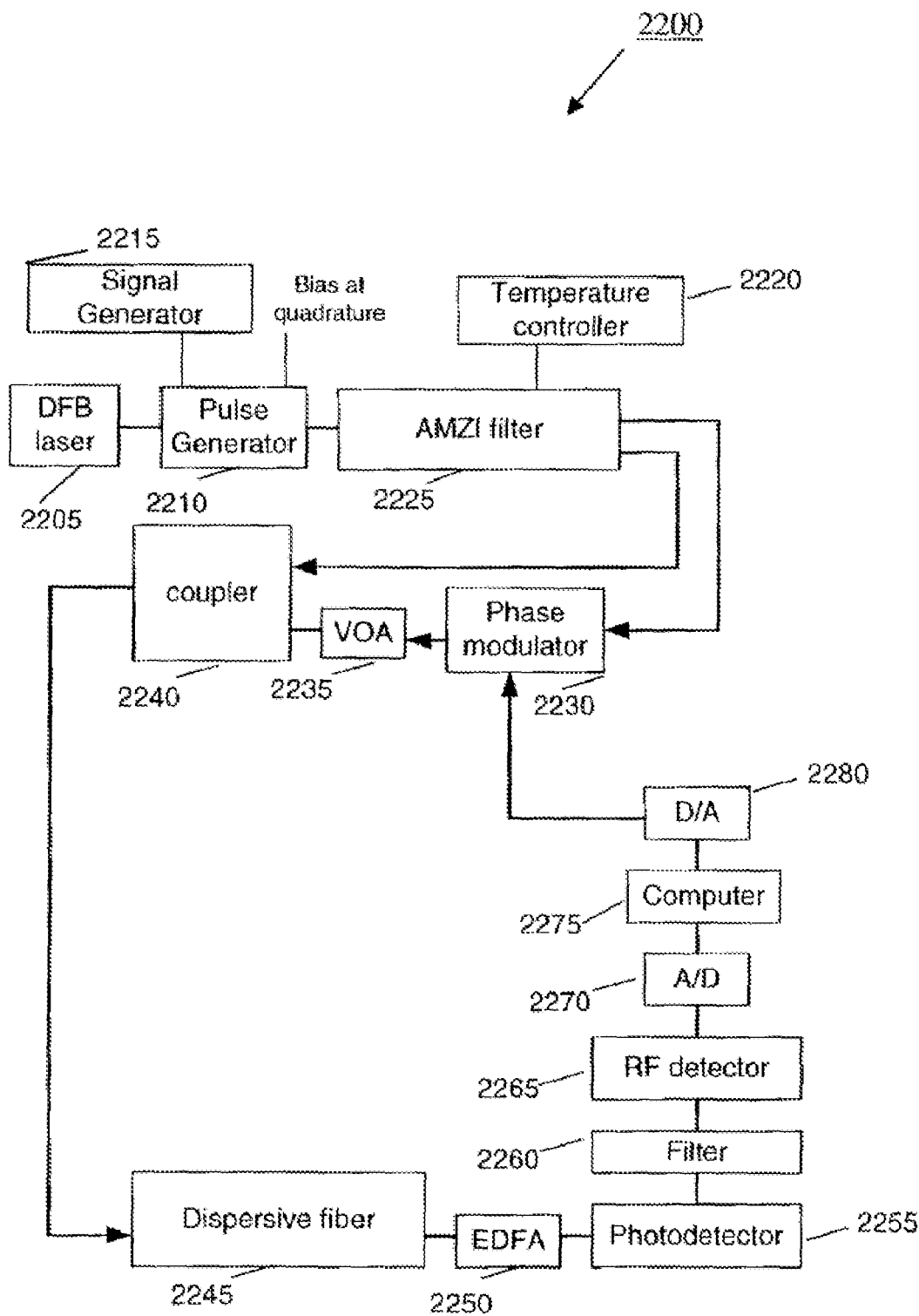
FIG. 22 shows a test setup for testing the method for adaptive pulse shape correction described in connection with FIG. 17.

The inventors conducted another experiment relating to the operation of the method for the adaptive pulse-shape correction described above in reference to FIG. 17. FIG. 22 shows a test setup for testing the method for adaptive pulse-shape correction described in connection with FIG. 17. Similar to the test setup shown in FIG. 19, test setup 2200 includes a distributed feedback (DFB) laser 2205, pulse generator 2210, signal generator 2215, temperature controller 2220, AMZI filter 2225, phase modulator 2230, VOA 2235, coupler 2240, dispersive fiber 2245, EDFA 2250, photodetector 2255, filter 2260, RF detector 2265, A/D converter 2270, computer 2275 and D/A converter 2280.

The test setup shown in FIG. 22 differs from the test setup shown in 19 in the signal detection portion and in the closed loop to correct the pulse pre-chirp. After EDFA 2250, the received signal is detected by photodetector 2255. The tone 6.25 GHz (corresponding to the 6.25 GHz signal added by pulse generator 2210) is obtained from the output electrical signal after using the filter 2260. The intensity of the tone is measured by RF detector 2265. This signal is converted into digital by AID converter 2270, and digital signal processing is performed by computer 2275. The resulting corrected signal is converted back to analog form by D/A converter 2280 and applied to phase modulator 2230 to correct the pulse shape. The dithering algorithm described in FIG. 18 can be applied. As shown in FIG. 20*b*, the pulse-shape-corrected pulses (signal 2030) maintain their shape in time when adaptive shape correction is applied. In the absence of the adaptive shape correction, the pulse shape "breathes" in time in an undesired manner.

CONCLUSION

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

The previous description of the preferred embodiments is provided to enable any person skilled in the art to make or use the present invention. While the invention has been particularly shown and described with reference to preferred embodiments thereof, it will be understood by those skilled in the art that various changes in form and details may be made therein without departing from the spirit and scope of the invention.

What is claimed is:

1. A method for generating optical pulses for optical communications using a transmission link, comprising: receiving, for a first channel, an optical signal and a first clock signal, the first clock signal being associated with a predetermined pulse shape, the predetermined pulse shape being selected to maximize Q-factor of the signal transmitted via the transmission link; and modifying the optical signal based on the first clock signal to produce an optical pulse having the predetermined pulse shape, wherein: the optical signal is a continuous-wave (CW) signal; and the predetermined pulse shape being a quasi-return-to-zero (quasi-RZ) pulse shape, wherein the signal intensity is essentially above zero between the pulses.

2. The method of claim 1, wherein: the clock signal includes a swing voltage and a voltage bias, the swing voltage and the voltage bias being selected to substantially maximize a Q-factor associated with the predetermine pulse shape and the transmission link.

3. The method of claim 1, further comprising: receiving, for the first channel, a second optical signal and a third clock signal, the second clock signal being based on an error signal, the error signal based on a transmission of the optical pulse over the transmission link; and modifying the second optical signal based on the third clock signal to produce a corrected optical pulse having a corrected pulse shape, the corrected pulse shape being associated with the transmission characteristic of the transmission link at a time subsequent to the predetermined pulse shape associated with the first clock signal.

4. The method of claim 1, further comprising: phase modulating the optical signal or the optical pulse with data using phase-shift keying (PSK), the first channel being a wavelength-division multiplexed (WDM) channel from a plurality of WDM channels, each WDM channel from the plurality of WDM channels being associated with its own modulation signal.

5. The method of claim 1, further comprising: phase modulating the optical signal or the optical pulse with data using differential phase-shift keying (DPSK), the first channel being a wavelength-division multiplexed (WDM) channel from a plurality of WDM channels, each WDM channel from the plurality of WDM channels being associated with its own modulation signal.

6. The method of claim 1, further comprising: amplitude modulating the optical signal or the optical pulse with data using on-off keying (OOK), the first channel being a wavelength-division multiplexed (WDM) channel from a plurality of WDM channels, each WDM channel from the plurality of WDM channels being associated with its own modulation signal.

7. The method of claim 1, further comprising: time-division multiplexing the optical pulse or the optical signal for the first channel with an optical pulse or an optical signal for a second channel, the first channel and the second channel from a plurality of optical-time-division multiplexed (OTDM) channels.

8. A method for generating optical pulses for optical communications using a transmission link, comprising: receiving, for a first channel, an optical signal and a first clock signal, the first clock signal being associated with a predetermined pulse shape, the predetermined pulse shape being selected to maximize Q-factor of the signal transmitted via the transmission link; and modifying the optical signal based on the first clock signal to produce an optical pulse having the predetermined pulse shape, wherein: the optical signal is a continuous-wave (CW) signal; and the predetermined pulse shape being a quasi-return-to-zero (quasi-RZ) pulse shape, comprising: forming the optical signal as a continuous wave and having a first spectral component, the optical signal being modified so that the optical pulse has the first spectral component, a second spectral component and a third spectral component, the second spectral component and the third spectral component of the optical pulse being associated with the second clock signal.

9. The method of claim 8, wherein the modifying includes: splitting the optical signal onto a first optical path and a second optical path, the first spectral component of the optical signal being associated with the first optical path, the second spectral component and the third spectral component of the optical signal being associated with the second optical path; modifying a phase of the first spectral component of the optical signal on the first optical path based on a first phase adjustment signal; and combining the first spectral component of the optical signal associated with the first optical path with the second spectral component and the third spectral component of the optical signal associated with the second optical path, wherein the first phase adjustment signal being associated with the first clock signal.

10. The method of claim 8, wherein the modifying includes: splitting the optical signal onto a first optical path and a second optical path, the first spectral component of the optical signal being associated with the first optical path, the second spectral component and the third spectral component of the optical signal being associated with the second optical path; modifying a phase of the second spectral component and the third spectral component of the optical signal on the second optical path based on a second phase adjustment signal; and combining the first spectral component of the optical signal associated with the first optical path with the second spectral component and the third spectral component of the optical signal associated with the second optical path, wherein the second phase adjustment signal being associated with the first clock signal.

11. The method of claim 10, further comprising: modifying a phase of the first spectral component of the optical signal to produce an optical pulse having the predetermined pulse shape.

12. A method of the claim 8, further comprising: detecting a signal based on an optical pulse having the first spectral component, the second spectral component and the third spectral component, the second spectral component and the third spectral component being based on the second clock frequency; filtering the detected signal to produce a first signal associated with the second clock frequency; and detecting an amplitude of the first signal.

13. The method of claim 12, wherein: the filtering is performed over a bandpass spectral response, the second clock frequency being within the spectral response of the bandpass filter.

14. The method of claim 12, further comprising: receiving a plurality of optical pulses including a training optical pulse and the optical pulse modulated with data.

15. The method of claim 12, wherein: the second clock frequency is a microwave frequency; the first spectral component of the optical pulse has an optical frequency; the second spectral component of the optical pulse has its own frequency corresponding to a sum of the optical frequency and the microwave frequency; and the third spectral component of the optical pulse has its own frequency corresponding to a difference of the optical frequency and the microwave frequency.

16. The method of claim 12, wherein: the amplitude of the first signal is associated with a pulse width of an optical pulse received from the transmission link; and an error signal being associated with a difference between the pulse width of the optical pulse and a predetermined pulse width, the predetermined pulse width being based on a transmission characteristic of the transmission link.

17. A method of claim 12, further comprising: sending a plurality of testing signals each being associated with its own dithered value from a plurality of dithered values, each dithered value from the plurality of dither values being associated with at least one from a center value and an offset value; receiving a plurality of optical pulses each being uniquely associated with an testing signal from the plurality of testing signals; detecting a plurality of modulation signals based on the plurality of optical pulses, each modulation signal from the plurality of modulation signals having its own amplitude and a spectral component with a modulation frequency; and calculating a new center value based on the amplitude of modulation signals.

18. The method of claim 17, wherein: the plurality of testing signals includes a first testing signal, a second testing signal and a third testing signal, the sending includes: sending the first testing signal, the first testing signal being associated with a difference of a center value and an offset value; sending the second testing signal, the second testing signal being associated with the center value; sending the third testing signal, the third testing signal being associated with a sum of a center value and an offset value.

19. The method of claim 17, wherein the receiving includes: receiving an optical pulse based on the first testing signal, the optical pulse for the first testing signal being associated with its own amplitude; receiving an optical pulse based on the second testing signal, the optical pulse for the second testing signal being associated with its own amplitude; and receiving an optical pulse based on the third testing signal, the optical pulse for the third testing signal being associated with its own amplitude.

20. The method of claim 17, wherein: the new center value is calculated by selecting a maximum amplitude from the amplitude of modulation signal for the first testing signal, the amplitude of the modulation signal for the second testing signal and the amplitude of the modulation signal for the third testing signal.

21. An apparatus for an optical pulse shape formation from a continuous optical wave having an optical frequency f, comprising: an optical modulator driven by a second clock signal with a frequency F, a demultiplexer connected to an output of the optical modulator, the demultiplexer splitting the received light of frequencies f+F, f, f−F into different waveguides, a phase shifter introducing a phase shift in at least one of the spectral components f+F, f or f−F, and a multiplexer combining light of all three spectral components, a data modulator for data embedding in the optical pulse for transmission in a communication link.

22. The apparatus of claim 21, wherein the demultiplexer is an asymmetric Mach-Zender interferometer.

23. The apparatus of claim 21, wherein the multiplexer is an asymmetric Mach-Zender interferometer.

24. The apparatus of claim 21, wherein the multiplexer is the demultiplexer operating in backward light transmission mode.

25. The apparatus of claim 21, wherein the frequency F is microwave.

26. The apparatus of claim 21, wherein the data modulator modulates the optical pulse with data using phase-shift keying (PSK).

27. The apparatus of claim 21, wherein the data modulator modulates the optical pulse with data using differential phase-shift keying (DPSK).

28. The apparatus of claim 21, wherein the data modulator modulates the optical pulse with data using on-off keying (OOK).

* * * * *